(12) United States Patent
Holmann et al.

(10) Patent No.: US 6,851,045 B2
(45) Date of Patent: *Feb. 1, 2005

(54) MICROPROCESSOR HAVING DELAYED INSTRUCTIONS WITH VARIABLE DELAY TIMES FOR EXECUTING BRANCH INSTRUCTIONS

(75) Inventors: Edgar Holmann, Tokyo (JP); Toyohiko Yoshida, Tokyo (JP)

(73) Assignee: Renesas Technology Corp., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 760 days.

This patent is subject to a terminal disclaimer.

(21) Appl. No.: 09/116,260

(22) Filed: Jul. 16, 1998

(65) Prior Publication Data

US 2001/0013095 A1 Aug. 9, 2001

Related U.S. Application Data

(62) Division of application No. 08/788,839, filed on Jan. 27, 1997, now Pat. No. 5,815,698.

(30) Foreign Application Priority Data

Aug. 1, 1996 (JP) ............................................ 96-203675

(51) Int. Cl.$^7$ ............................................... G06F 13/00
(52) U.S. Cl. ...................................................... 712/234
(58) Field of Search ................................ 712/237, 233, 712/234, 215, 213, 241, 214; 713/600

(56) References Cited

U.S. PATENT DOCUMENTS

| | | | | |
|---|---|---|---|---|
| 4,847,755 A | * | 7/1989 | Morrison et al. ........... 395/379 |
| 4,929,396 A | | 5/1990 | Barer et al. .................. 384/607 |
| 5,202,967 A | * | 4/1993 | Matsuzaki et al. .......... 712/212 |
| 5,305,446 A | | 4/1994 | Leach et al. ........... 395/800.34 |
| 5,371,860 A | * | 12/1994 | Mura et al. .................... 710/22 |
| 5,535,348 A | | 7/1996 | Leach et al. ................. 395/588 |
| 5,581,776 A | * | 12/1996 | Hagqvist et al. ............. 712/243 |
| 5,615,386 A | * | 3/1997 | Amerson et al. ............ 712/238 |
| 5,664,135 A | * | 9/1997 | Schlansker et al. ......... 712/201 |
| 5,664,193 A | * | 9/1997 | Tirumalai .................... 395/705 |
| 5,765,037 A | * | 6/1998 | Morrison et al. ............ 395/559 |

FOREIGN PATENT DOCUMENTS

| | | |
|---|---|---|
| JP | 6-131180 | 5/1994 |
| JP | 6-274352 | 9/1994 |

OTHER PUBLICATIONS

"Optimizing Delayed Branches", Gross et al., Departments of Electrical Engineering and Computer Science, Stanford University, 0194–1895/82/0000/014, 1982 IEEE, pp. 114–120.

"Reducing the Cost of Branches", McFarling et al., Computer Systems Laboratory, Stanford University, 0884–7495/86/0000/0396, 1986 IEEE, pp. 396–403.

Computer Architecture A Quantitative Approach, Hennessy et al., "The Major Hurdle of Pipelining–Pipeline Hazards", pp. 272–278.

* cited by examiner

Primary Examiner—Gautam R. Patel
(74) Attorney, Agent, or Firm—Burns, Doane, Swecker & Mathis, L.L.P.

(57) ABSTRACT

A microprocessor including an instruction decoder for decoding a branch instruction to output a decoded result, a program counter, and a program counter controller for controlling the program counter on the basis of the decoded result. The program counter controller includes a first register for storing a first program counter value output from the instruction decoder. The program counter controller detects a coincidence of the first program counter value stored in the first register with a value of the program counter to set a second program counter value indicating a branch target of the branch instruction into the program counter.

23 Claims, 17 Drawing Sheets

```
ADD  r3,  r0,  6
SRA  r4,  r0,  8
SRA  r3,  r3,  1
SUB  r4,  r4,  r3
MUL  r5,  r3,  4
ADD  r4,  r4,  r10
MUL  r11, r11, r5
JMP  TGT
```

FIG. 3

```
ADD  r3, r0, 6
SRA  r4, r0, 8
SRA  r3, r3, 1
SUB  r4, r4, r3
MUL  r5, r3, 4
ADD  r4, r4, r10
MUL  r11, r11, r5
JMP  TGT
```

FIG. 4

```
ADD  r3, r0, 6      SRA  r4, r0, 8
SRA  r3, r3, 1      NOP
SUB  r4, r4, r3     MUL  r5, r3, 4
ADD  r4, r4, r10    MUL  r11, r11, r5
JMP  TGT
```

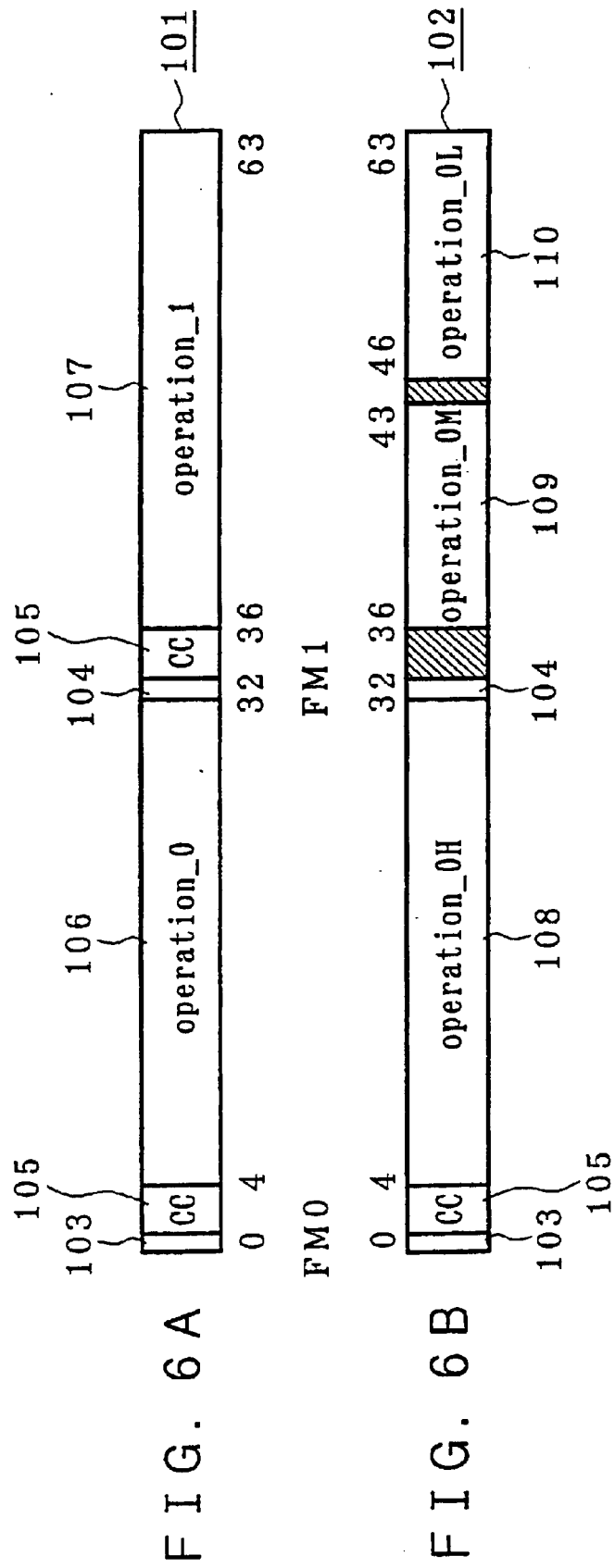

FIG. 7

| | 0 | 7 | 9 | 15 | 21 | 27 | |
|---|---|---|---|---|---|---|---|
| Short_M | OPCODE | X | Ra | Rb | SOURCE | | 111 |
| | 120 | 124 | 121 | 122 | 123 | | |

| | 0 | 7 | 9 | 15 | 21 | 27 | |
|---|---|---|---|---|---|---|---|
| Short_A | OPCODE | X' | 0 | Ra | Rb | SOURCE | 112 |
| | 120 | 125 | | 121 | 122 | 123 | |

| | 0 | 7 | 9 | 15 | 21 | 27 | |
|---|---|---|---|---|---|---|---|
| Short_B1 | OPCODE | 0 | 0 | 0 | 0 | Rc' | 113 |
| | 120 | | | | | 126 | |

| | 0 | 7 | 9 | 27 | |
|---|---|---|---|---|---|
| Short_B2 | OPCODE | 1 | 0 | DISPLACEMENT:18 | 114 |
| | 120 | | | 127 | |

| | 0 | 7 | 9 | 15 | 27 | |
|---|---|---|---|---|---|---|
| Short_B3 | OPCODE | Y | Z | Ra | SOURCE | 115 |
| | 120 | 129 | 130 | 121 | 128 | |

| | 0 | 7 | 9 | 15 | 27 | |
|---|---|---|---|---|---|---|
| Short_D1 | OPCODE | Y | 0 | Ra | SOURCE | 116 |
| | 120 | 129 | | 121 | 128 | |

| | 0 | 7 | 9 | 15 | 27 | |
|---|---|---|---|---|---|---|
| Short_D2 | OPCODE | Y | 0 | ct:6 | SOURCE | 117 |
| | 120 | 129 | | 131 | 128 | |

| | 0 | 7 | 9 | 15 | 21 | 53 | |
|---|---|---|---|---|---|---|---|
| Long | OPCODE | 1 | 0 | Ra | Rb | IMMEDIATE VALUE:32 | 118 |
| | 120 | | | 121 | 122 | 132 | |

(123)
X=00 => SOURCE=Rc
X=01 => SOURCE=Rc;Rb++
X=11 => SOURCE=Rc;Rb--
X=10 => SOURCE=IMMEDIATE
　　　　　　VALUE:6

(123)
X'=0 => SOURCE=Rc
X'=1 => SOURCE=IMMEDIATE
　　　　　　VALUE:6

(129)
Y=0 => SOURCE=Rc
Y=1 => SOURCE=IMMEDIATE
　　　　　　VALUE:12

Z=0 => TEST FOR ZERO
Z=1 => TEST FOR VALUES
　　　　OTHER THAN ZERO

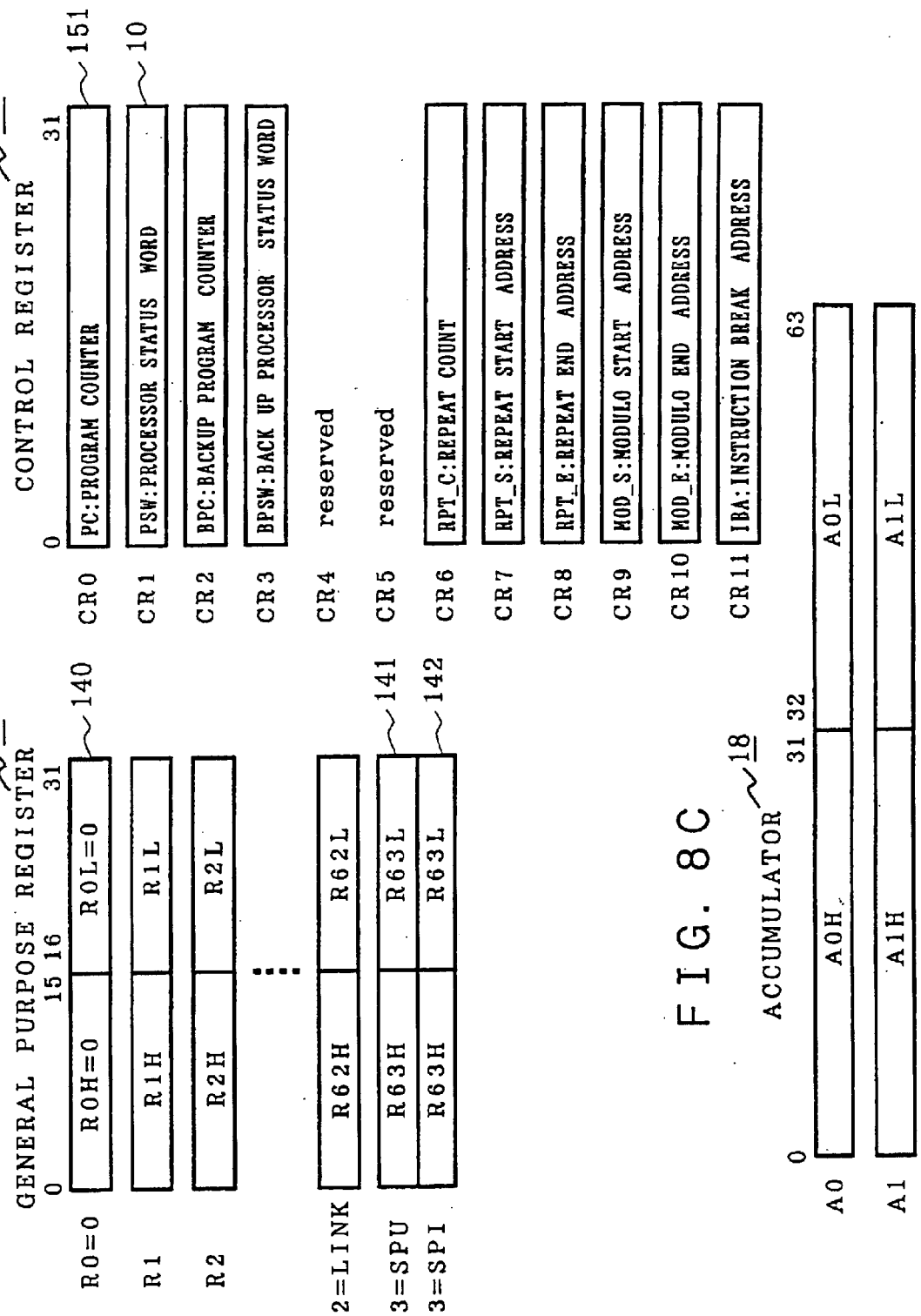

FIG. 9

| bit | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| | SM | 0 | EA | DB | 0 | IE | RP | MD | 0 | 0 | 0 | 0 | 0 | 0 | 0 | 0 |

171 — SM
172 — EA
173 — DB
174 — IE
175 — RP
176 — MD

170

| bit | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| | 0 | F0 | 0 | F1 | 0 | F2 | 0 | F3 | 0 | F4 | 0 | F5 | 0 | F6 | 0 | F7 |

181 — F0
182 — F1

180

FIG. 10
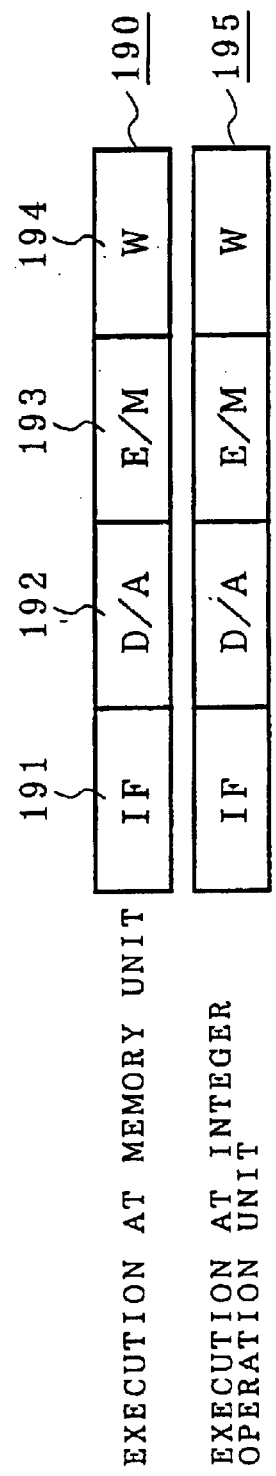
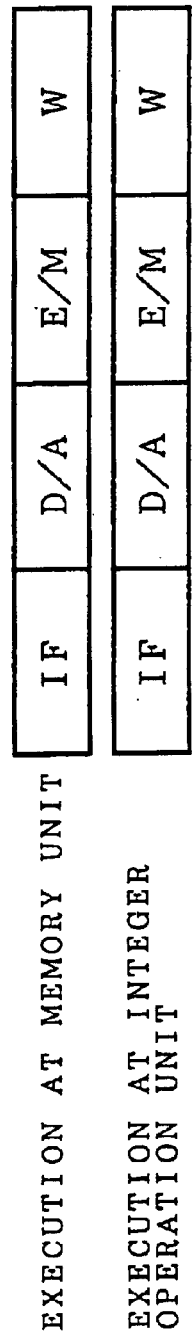
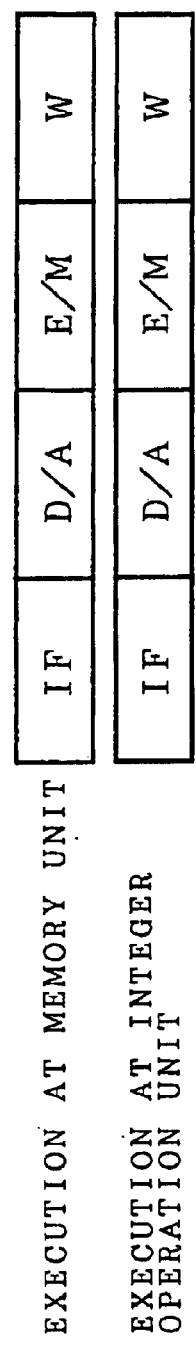

FIG. 16

```
        ADD    r3, r4, r5
        DBRA   3, TGT1
        SUB    r3, r4, 10    ←——— delay slot 1
        SRA    r1, r2, r3    ←——— delay slot 2
        ADD    r3, r4, 11    ←——— delay slot 3
        ...
TGT1:   ADD    r3, r4, 20
        ...
```

FIG. 17

```
        ADD    r4, r0, 4
        ADD    r3, r0, 5
        DJSR   r4, TGT1
        SUB    r3, r4, 10    ←——— delay slot 1
        SRA    r1, r2, r3    ←——— delay slot 2
        ADD    r3, r4, 11    ←——— delay slot 3
        ADD    r8, r8, 2     ←——— delay slot 4
        ...
TGT1:   ADD    r3, r4, 20
        ...
        RSR
```

FIG. 19

```
ADD  r3, r0, 6        SRA   r4, r0, 8
SRA  r3, r3, 1        DJMP  2, TGT
SUB  r4, r4, r3       MUL   r5, r3, 4
ADD  r4, r4, r10      MUL   r11, r11, r5
```

FIG. 20

```
ADD  r3, r10, 6
ADD  r4, r4, 8
SRA  r8, r3, 1
MUL  r5, r3, 4
```

FIG. 21

```
ADD  r3, r10, 6       DADD  1, r4, r4, 8
SRA  r8, r3, 1        MUL   r5, r3, 4
```

FIG. 22

| 0 | | | | | | 7 | 8 | | | | | | | 15 |
|---|---|---|---|---|---|---|---|---|---|---|---|---|---|---|
| SM | 0 | EA | DB | 0 | IE | RP | MD | 0 | E4 | 0 | E3 | 0 | E2 | 0 | E1 |

380

381 — RP MD
382 — E4
383 — E3
384 — E2
385 — E1

| 16 | | | | | | 23 | 24 | | | | | | | 31 |
|---|---|---|---|---|---|---|---|---|---|---|---|---|---|---|
| 0 | F0 | 0 | F1 | 0 | F2 | 0 | F3 | 0 | F4 | 0 | F5 | 0 | F6 | 0 | F7 |

390

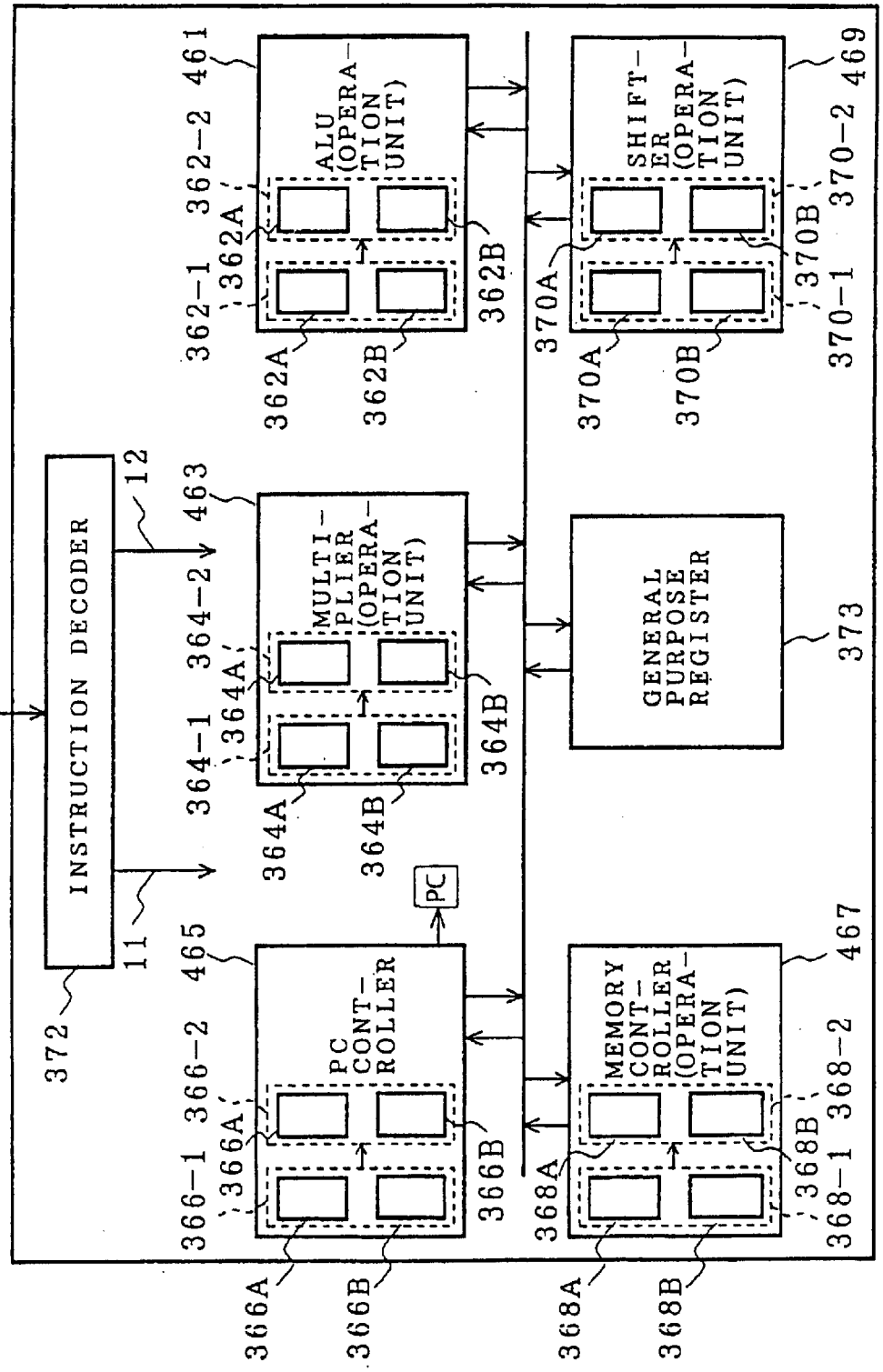

US 6,851,045 B2

MICROPROCESSOR HAVING DELAYED INSTRUCTIONS WITH VARIABLE DELAY TIMES FOR EXECUTING BRANCH INSTRUCTIONS

This application is a divisional of application Ser. No. 08/788,839, filed Jan. 27, 1997 now U.S. Pat. No. 5,815,698.

BACKGROUND OF THE INVENTION

1. Field of the Invention

The present invention relates to a microprocessor having delayed instructions which is capable of executing the delayed instructions after a variable delayed time is elapsed.

2. Description of Related Art

FIG. 1 is a diagram showing the sequence of process of a conventional microprocessor which will be performed based on a pipeline control. In FIG. 1, the reference number 300 designates a branch instruction, 301 denotes an instruction fetch stage in the pipeline, 302 indicates a decode stage in the pipeline, 303 designates an instruction execution stage in the pipeline, 304 denotes a write back stage in the pipeline, 305 indicates an instruction in the first delay slot, 306 designates an instruction in the second delay slot, and 307 designates an instruction to be executed at the branch target.

Hereinafter, when only the term "a branch instruction" is used, the meaning of this term includes the following two cases:

a) An instruction that will be branched to a target address indicated by a value obtained by adding an offset value stored in an operand in an instruction to a program counter (PC) value; and b) An instruction that will be branched to a target address indicated by using an operand directly or indirectly.

When both a branch instruction and a jump instruction are described in a program, these are a branch instruction to be branched to an address as a value obtained by adding an offset value specified by an operand to a program counter value and a jump instruction to be branched directly or indirectly to an address indicated by using an operand, respectively. In addition, each of a branch instruction and a jump instruction include a subroutine-call instruction in this specification.

Next, the operation of the conventional microprocessor will be explained.

When a branch instruction is executed, the microprocessor based on a pipeline control shown in FIG. 1 gets the branch target address in the instruction execution stage at the third stage of the pipeline. At this time, instruction 305 in the first delay slot and instruction 306 in the second delay slot are at the decode stage 302 and the instruction fetch stage 301, respectively. The conventional microprocessor must treat those instructions as invalid instructions. This causes a waste in the pipeline processing. In order to eliminate this waste in the pipeline processing, there are many kinds of methods, examples of which have been disclosed in the following literature: "Computer Architecture A Quantitative Approach", John L. Hennessy and David A Patterson, Morgan Kaufmann Publishers INC., 1990, pp.272–278. For example, in this method, an instruction scheduling or a combination of the instruction scheduling and delayed branch instructions is used in order to eliminate the waste in the pipeline. For example, the literatures, the Japanese Laid-open Publication Numbers JP-A-6/274352 and JP-A-6/131180, show the technique related to delayed branch instructions.

In general, the size of a delayed value in a delayed branch instruction is a fixed value corresponding to the architecture of a microprocessor. In one specific case, instructions to designate the number of variable delay slots are disclosed in the literature, the Japanese Laid-open Publication Numbers JP-A-6/131180.

The number of delay slots which has been designated is stored in a decrement counter. The value stored in the decrement counter is decreased according to receiving the appropriate clock signals. When this value becomes 1, a fetch operation of the branch target instruction is initiated.

FIG. 2 shows a block diagram showing a common configuration of an instruction decoder and an instruction execution section as a part of the conventional microprocessor that can execute two operations simultaneously. In FIG. 2, the reference number 341 designates an arithmetic logic unit (ALU) for executing arithmetic logic operations, 342 denotes a multiplier for executing multiplication operations, 343 indicates a program counter (PC) controller to calculate a PC value, 344 designates a memory controller for performing address calculation, 345 denotes a shifter for performing shift operations, 346 indicates a bus group consisting of buses through which two instructions will be transferred during one cycle, 348 indicates a general purpose register file, and 347 designates a decoder for decoding instructions and for transferring control signals 11 and 12 as decoded results to the instruction execution section comprising the ALU 341, the multiplier 342, the PC controller 343, the memory controller 344, the general purpose register file 348, and the shifter 345.

FIG. 3 is an explanation diagram showing an example of a program which will be executed in the conventional microprocessor. In FIG. 3, reference characters ADD, SRA, SUB, MUL, and JMP designate an add instruction, a shift instruction, a subtraction instruction, a multiply instruction and a jump instruction, respectively.

These instructions, ADD, SRA, SUB, MUL, and JMP are executed by the ALU 341, the shifter 345, the PC controller 343, and the multiplier 342 in the instruction execution section. The general purpose register file 348 holds the registers used for these operations. For example, the reference character (r3, r0, 6) indicates that the operation result obtained by performing operation between a value of the register r0 in the general purpose register file 348 and an immediate value "6" is stored into the register r3 in the general purpose register file 348.

The conventional microprocessor based on the pipeline shown in FIG. 1 can execute two instructions at the same time. Therefore, the program including the instructions shown in FIG. 3 can be converted into different instructions that execute two instructions at the same time taking care to avoid resource conflicts that would happen in the pipeline. For example, as shown in FIG. 4, the conventional microprocessor can perform each of the converted instructions.

In FIG. 4, each line corresponds to one instruction as a two-operation instruction. That is, each line shows two-operations which will be executed at the same time. There are no resource conflicts between the instructions SRA and SUB, however, these instructions have a register dependence relationship. Therefore, these two instructions SRA and SUB cannot be executed at the same time. Because of this, the no operation NOP is written at the second line in the program shown in FIG. 4. This instruction scheduling for these instructions are performed by a compiler or a programmer.

The conventional microprocessor having the configuration described above includes the following problems (1) to (3):

(1) In the conventional microprocessor having branch instructions, it is difficult to schedule instructions effectively because the delayed value specified by each delayed instruction is fixed. For example, it is possible to delete the JMP instruction at the fifth line in the program shown in FIG. 4 and to place a delayed jump instruction of a delayed value "2" at the second line instead of the NOP already written. Thereby, the fetch operation for the instruction addressed by the jump target address TGT can be executed immediately after the instruction fetch operation at the fourth line in the program shown in FIG. 4 is completed. This results in no pipeline waste.

Conventional microprocessors specifying only delayed values of "2" can execute such delayed branch instruction. However, for example, when using microprocessors designating only delayed values of "3", a programmer or a compiler would not be able to the instructions shown in FIG. 4 to avoid a cycle loss.

(2) The configuration of a conventional microprocessor in which a value for designating a delayed value is written into a decrement counter becomes less practical when interrupts or new branch operations happen while a delayed instruction is pending. For example, because the value in the decrement counter is decreased according to operation clocks, if there is no consideration for the decrement counter value, operation clocks between the designated delayed value and an actual delayed value will get out of order by operation clocks used for interrupt processing and the like.

(3) In the conventional microprocessors, because branch instructions are the only delayed instructions, that is instructions other than the branch instructions have no delayed capability, it is difficult to schedule instructions effectively.

SUMMARY OF THE INVENTION

Accordingly, the intent of the present invention is, with due consideration to the drawbacks of the conventional microprocessors, to provide a microprocessor having delayed instructions which is capable of executing programs at a high speed rate. Thereby, the present invention provides programmers a condition in which the delayed instructions with variable delayed values are executed without causing any processing errors and effective instruction scheduling can be performed.

In accordance with a preferred embodiment according to the present invention, a microprocessor having delayed instructions comprises an instruction decoder for decoding instructions including said delayed instructions and an instruction execution section for executing said instructions according to output transferred from said instruction decoder. In the microprocessor of the present invention, said instruction execution section comprises a program counter controller (PC controller) for controlling a program counter value and said PC controller comprises delayed branch instruction storing means for storing values indicating target branch addresses of delayed branch instructions as said delayed instructions and a program counter value related to a delayed value designated by said delayed branch instructions.

In accordance with a preferred embodiment according to the present invention, a microprocessor having delayed instructions comprises an instruction decoder for decoding instructions including said delayed instructions and an instruction execution section for executing said instructions according to output transferred from said instruction decoder. In the microprocessor of the present invention, said instruction execution section comprises an operation unit, said operation unit comprises delayed instruction storing means for storing operation information designated by delayed operation instruction as said delayed instructions and for storing a value indicating an execution start of operation of said delayed operation instruction. In the microprocessor of the present invention, each of the operation units in the instruction execution section comprises the delayed instruction storing means for storing contents of delayed operation instructions and values related to fixed values or variable delayed values in the delayed operation instructions. Here, the contents of the delayed operation instructions are information indicating operation types to be executed as decoded results of the delayed operation instructions. In addition, delayed branch instructions are not included in the delayed operation instructions unless an explanatory annotation is given.

In the microprocessor as another preferred embodiment according to the present invention, said delayed instruction storing means stores a value related to a delayed value designated by said delayed operation instruction.

In the microprocessor as another preferred embodiment according to the present invention, said delayed instruction storing means stores a program counter value related to a delayed value designated by said delayed operation instruction.

In the microprocessor as another preferred embodiment according to the present invention, said operation unit comprises a plurality of operation units, and each of said plurality of operation units comprises a plurality of said delayed instruction storing means.

In the microprocessor as another preferred embodiment according to the present invention, said instruction execution section or said operation unit comprises a plurality of operation units which are capable of executing a plurality of operations at the same time.

BRIEF DESCRIPTION OF THE DRAWINGS

These and other objects, features, aspects and advantages of the present invention will become more apparent from the following detailed description of the present invention when taken in conjunction with the accompanying drawings, in which:

FIG. 3 is an explanation diagram showing an example of a program;

FIG. 4 is an explanation diagram showing an example of an instruction scheduling;

FIGS. 6A and 6B are explanation diagrams showing an instruction format used in the microprocessor shown in FIG. 5.

FIG. 7 is an explanation diagram showing detailed contents of operation fields in the instruction formats shown in FIGS. 6A and 6B;

FIGS. 8A, 8B and 8C are explanation diagrams showing a register configuration of the microprocessor shown in FIG. 5;

FIG. 9 is an explanation diagram showing a detailed content of the Processor Status Word (PSW);

FIG. 10 is an explanation diagram showing a pipeline operation during a parallel execution of a set of two-instructions in the microprocessor shown in FIG. 5;

FIG. 16 is an explanation diagram showing an example of a program including delayed instructions;

FIG. 17 is an explanation diagram showing another example of a program including delayed instructions;

FIG. 19 is a an explanation diagram showing an example of instruction arrangement when two operations are executed at the same time;

FIG. 20 is an explanation diagram showing an example of a program;

FIG. 21 is an explanation diagram showing an instruction arrangement when two operation are executed at the same time based on each instruction shown in FIG. 20;

FIG. 22 is an explanation diagram showing an example of a PSW in the microprocessor of the second embodiment according to the present invention shown in FIG. 18; and FIG. 23 is a block diagram showing an instruction decode section and an instruction execution section in a microprocessor as the third embodiment according to the present invention.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the microprocessor according to the present invention will now be described with reference to the drawings.

First Embodiment

Figure 5:
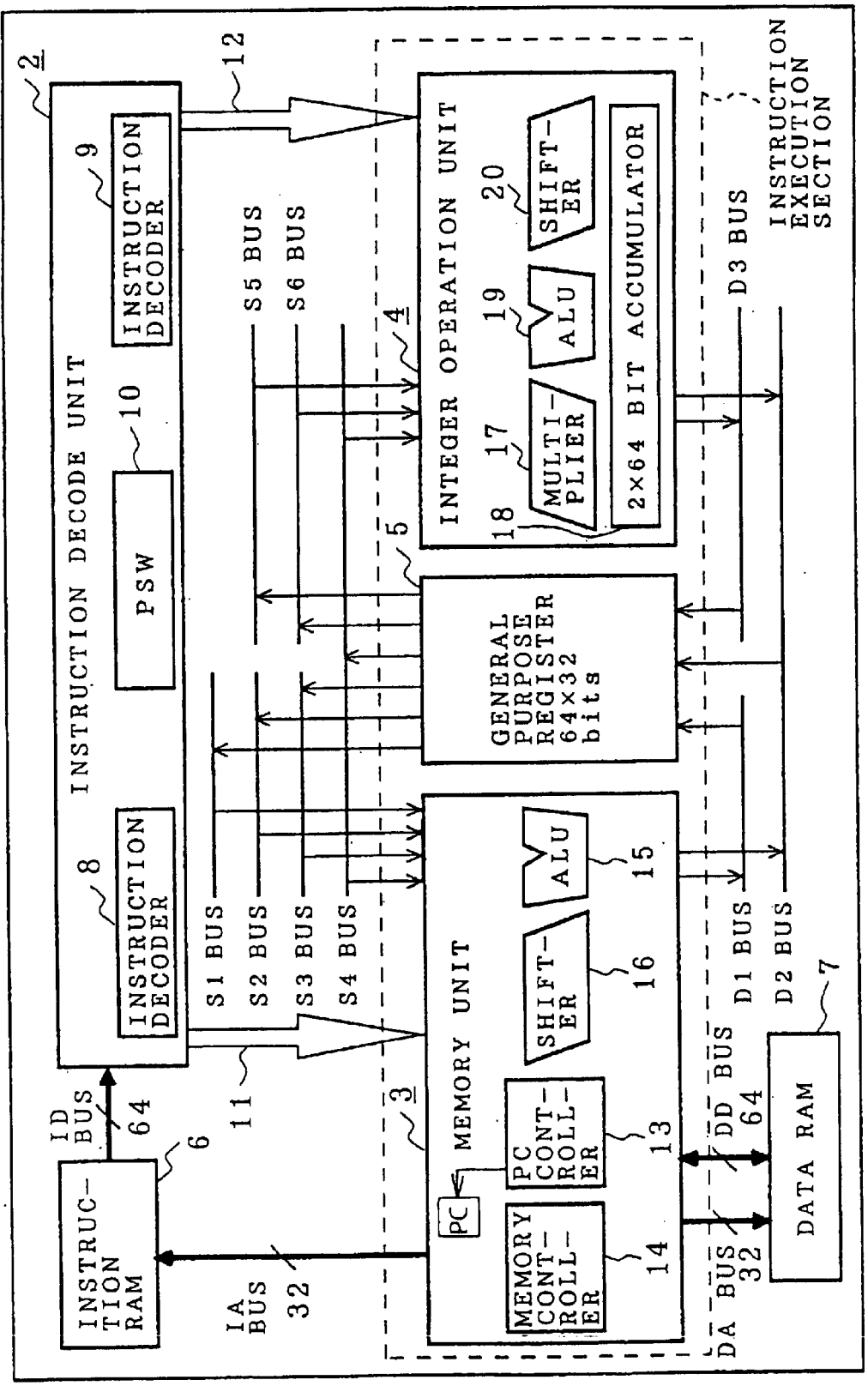
FIG. 5 is a block diagram showing a basic configuration of a microprocessor according to the present invention.

FIG. 5 is a block diagram showing a basic configuration of the microprocessor according to the present invention. This microprocessor is a 32 bit microprocessor having 32 bit and 64 bit internal buses where the ID bus, DD bus, and D2 bus are 64 bits. In FIG. 5, the reference number 2 designates an instruction decode unit (instruction decoder) for decoding instruction codes transferred from an instruction RAM 6 through a 64-bit wide ID bus, 3 denotes a memory unit for performing address calculation operations, 4 indicates an integer arithmetic unit (instruction execution section) for performing a logic operation and a shift operation, 5 designates a general purpose register file consisting of 32 bits×64 words, and the reference number 7 indicates a data RAM for storing data. In FIG. 5, an instruction execution section comprises the memory unit 3, the integer arithmetic unit 4 and the general purpose register file 5, for example.

In the instruction decode unit 2, the reference numbers 8 and 9 designate instruction decoders each of which decodes instructions, the reference number 10 indicates a Processor Status Word (hereinafter the processor status word will be referred to as "PSW") for indicating the state of a microprocessor. The instruction decode unit 2 generates a set of control signals 11 by using the decode result of the instruction decoder 8 and the content of the PSW 10 and then provides the control signals 11 to the memory unit 3. In addition, the instruction decode unit 2 further generates another set of control signals 12 based on a decode result of the instruction decoder 9 and the content of the PSW 10 and then transfers the control signals 12 to the integer arithmetic unit 4.

In the memory unit 3, the reference number 13 designates a Program Counter (PC) control section for calculating a new PC value obtained by adding eight to a current PC value for an instruction to be executed in the following step when instructions not including jump and branch operations are executed, for adding a branch displacement to a current PC value during execution of instruction including jump and branch operations, and for calculating a PC value, according to an addressing mode designated in the arithmetic operation, to be used for a target instruction indicated by a jump operation.

The PC control section 13 transfers the calculated PC value to the instruction RAM 6 through a 32-bit wide Instruction Access (IA) bus in order to output an instruction code from the instruction RAM 6. The reference number 14 denotes a memory control section for controlling access operation to data that will become an operand. This memory control section 14 transfers an address data to the data RAM 7 through a 32 bit wide DA bus width in order to access data, to be used for execution of the instruction previously fetched from the data RAM 7 through a 64-bit width DD bus. The reference number 15 designates an arithmetic Logic Unit (ALU) for executing arithmetic logic operations by using a maximum of 3 file data words transferred from the general purpose register 5 through S1, S2, and S3 buses, each bus having a 32-bit bus width and for transferring operation results to the general purpose register file 5 through a D1 bus, a 32-bit bus width. The reference number 16 denotes a shifter for executing a shift operation by using data transferred from the general purpose register file 5 through the S1, S2 and S3 buses and then for transferring an operation result to the general purpose register file 5 through the D1 bus.

The microprocessor shown in FIG. 5 can transfer four 32-bit wide words, through the S1, S2, S3, and S4 buses at the same time. Accordingly, for example, the following operation can be executed simultaneously data stored in the third register and in the register immediately above the third register are stored into a memory field addressed by a sum of data items stored in both the first and second registers. Furthermore, the memory unit 3 can transfer two word data transferred from the data RAM 7 from the address given by the sum of the data items stored in both the first and second registers into two consecutive registers in the general purpose register file 5 through the 64-bit bus such as the D2 bus.

In the integer arithmetic operation unit 4, the reference number 17 designates a multiplier for executing multiplication operation of two word data transferred from the general purpose register file 5 through the 32 bit buses such as the S5 and S6 buses and for transferring operation results to the general purpose register file 5 through the 64 bit bus such as the D2 bus. The reference number 18 indicates an accumulator (ACC) for accumulating arithmetic results and then storing the accumulated data or for subtracting arithmetic results and then storing the subtracted result. In the microprocessor of the preferred embodiment, two 64-bit accumulators are incorporated. The reference number 19 designates an arithmetic logic unit (ALU) for performing an arithmetic logic operation by using a maximum of 3 word data items transferred from the general purpose register file 5 through the S4, S5 and S6 buses and then for transferring arithmetic results to the general purpose register file 5 through the 32-bit D3 bus. The reference number 20 indicates a shifter for performing a shift operation by using data transferred from the general purpose register file 5 through the S4, S5 and S6 buses and then for transferring the operation results to the general purpose register file 5 through the D3 bus.

The microprocessor of the preferred embodiment can read a maximum of six register values from the general purpose register file 5. The read data items are transferred onto the S1, S2, S3, S4, S5, and S6 buses. In addition, a maximum of four register values can be written into the general purpose register file 5 through the D1, D2 and D3 buses at the same time. The D2 bus is a double width bus and this can transfer up to two data values into the general purpose register file 5.

FIGS. 6A and 6B are diagrams explaining instruction formats used in the microprocessor according to the present invention shown in FIG. 5.

The microprocessor according to the present invention has a two-instruction format 101 and a single instruction format 102 shown in FIG. 6A and FIG. 6B, respectively. The two instruction format 101 indicates two operations. The single instruction format 102 indicates one instruction. The two-instruction format 101 includes a format field consisting of fields 103 and 104, two operation fields 106 and 107 and two 3-bit CC fields 105 (or execution condition fields) related to the operation fields 106 and 107, respectively.

The single instruction format 102 has a format field consisting of fields 103 and 104, an operation field 108-110 and a 3-bit CC field 105 (or execution condition field) related to the operation field.

The format fields 103 and 104 are defined as follows:

| Code in Format field FM | Number of Instructions | Issuing order | |
|---|---|---|---|
| | | Operation_0 | Operation_1 |
| 00 | two | 1st | 1st |
| 01 | two | 1st | 2nd |
| 10 | two | 2nd | 1st |
| 11 | one | 1st | — | where, FM indicates a two-bit value stored in the fields 103 and 104.

When FM=00, the instruction to be executed is a two-operation instruction. In this case, both operations, the operation_0 indicated by the operation field 106 and the operation_1 indicated by the operation field 107, are executed concurrently in the clock cycle immediately following the decoding operation. The operation_0 is executed in the memory unit 3 and the operation_1 is performed in the integer operation unit 4.

When FM=01, the instruction to be executed is a two-operation instruction. In this case, the operation_0 is executed in the clock cycle immediately following the decoding operation and then operation_1 is executed in a clock cycle which is delayed from the execution of the operation_0 by one cycle.

When FM=10, the instruction to be executed is a two operation instruction. In this case, the operation_1 is executed in the clock cycle immediately following the decoding operation and then operation_0 is executed in a clock cycle which is delayed from the execution cycle of the operation_1 by one cycle.

When FM=11, the instruction to be executed is a single operation instruction. In this case, the operation indicated by using the operation field consisting of the fields 108, 109, and 110 is executed in the clock cycle immediately following the decoding cycle.

The 3-bit CC field 105 (or the execution condition field) is defined as follows:

| Code | Conditions to be executed |
|---|---|
| CC = 000 | Always |
| 001 | F0 = T and F1 = don't care |
| 010 | F0 = F and F1 = don't care |
| 011 | F0 = don't care and F1 = T |
| 100 | F0 = don't care and F1 = F |
| 101 | F0 = T and F1 = T |
| 110 | F0 = T and F1 = F |
| 111 | Reserved |

The 3-bit CC field 105 (or the execution condition field) determines whether the execution of the operation_0 in the operation fields 106 and 107, the execution of the operation_1 and the operations of the operation fields 108, 109, and 110 are active or inactive based on the status of the execution control flags, F0 and F1 flag bits. These execution control flags F0 and F1 will be explained later in detail.

The operation results are written into the registers, the memories and the flags only when the execution control flags indicate an active operation. When an operation is inactive, its results are not written into the registers, the memories, and the flags, so that the operation results are the same as these of a NOP instruction.

When the value CC of the execution condition field 105 is zero (CC=000), the operation is always active regardless of values of the operation control flags F0 and F1.

When CC=001, the operation is active only when the execution control flag F0=true. In this case, the state of the execution control flag F1 does not matter.

When CC=010, the operation is active only when F0=false. In this case, the status of the F1 flag does not matter.

When CC=011, the operation is active only when F1=true. In this case, the status of the F0 flag does not matter.

When CC=100, the operation is active only when F1=false. In this case, the status of the F0 flag does not matter.

When CC=101, the operation is active only when F0=true and F1=true.

When CC=110, the operation is active only when F0=true and F1=false.

When CC=111, the operation is undefined.

FIG. 7 is a diagram that gives a detailed explanation of the contents of the operation fields 106 to 110 in the instruction formats 101 and 102 shown in FIGS. 6A and 6B.

Each of the short formats 111 to 117 comprises a 28-bit short type operation field 106 or 107. The format 118 comprises a long-length type operation fields 108, 109 and 110.

Format 111 (Short M) consists of field 120 (an 8-bit opcode field) designating the type of operation, the two fields 121 and 122 (two 6-bit register specifier fields Ra and Rb) each designates a register number, field 123 (a 6-bit register specifier field) for specifying a register number or an immediate value and field 124 (a 2-bit operand identifier X) for indicating the type of data stored in the field 123.

As shown in FIG. 7, when the value X stored in field 124 is 00, 01 or 11, the content of field 124 indicates that field 123 stores a register number. When the value of field 123 is 10, the content in field 123 indicates that field 123 stores an immediate value. This format 111 is used for load-store instructions such as memory access operations with register indirect addressing modes. The memory location accessed is given by the address computed by adding the contents of the register specified by field 122 and either the contents of the register specified by field 123 or the immediate value stored in as specified by the 2-bit operation identifier X field 124. In addition, when the 2-bit operation identifier X=01, the contents of the register specified by field 122 are incremented by the size of the data transferred. When the operation identifier X=11, the contents of the register specified by field 122 are decremented by the size of the data transferred.

Format 112 (Short A, see FIG. 6) consists of field 120 (an 8-bit opcode field) designating the type of operation, the two fields 121 and 122 (two 6-bit register specifier fields Ra and Rb) each designates a register number, field 123 (a 6-bit register specifier field) for indicating a register number or an immediate value and field 125 (a 1-bit operand identifier Y) for indicating the type of data stored in the field 123.

As shown in FIG. 7, when the value X' stored in field 125 is "0", the content in field 125 indicates that field 123 designates a register number and when the value X' is "1", the content in field 125 indicates that field 123 stores an immediate 6-bit value. This format 112 is used for instructions such as arithmetic operations, logic operations, shift operations and so on.

Format 113 (Short B1) consists of field 113 (a 8-bit opcode field) designating the type of operation and field 126 (a 6-bit register specifier Rc field) for specifying a register number. This format 113 is used for jump and branch instructions with an address specified in a register (Rc).

Format 114 (Short B2) consists of field 120 (an 8-bit opcode field) designating the type of operation and field 127, an 18-bit displacement. This format 114 is used for jump and branch instructions with an immediate 18-bit displacement.

Format 115 (Short B3) consists of field 120 (an 8-bit opcode field) for designating the type of operation, field 121 (a 6-bit register specifier Ra field) for designating a register number, field 128 for designating a register number or a 12-bit immediate value, field 129 for indicating whether the field 128 stores a register number or an immediate value, and field 130 for indicating whether a conditional jump operation or a conditional branch operation is performed based on the contents of the register specified in field 121. This format 115 is used for conditional jump instructions and conditional branch instructions. Conditioned branch instructions that test whether the contents of the specified register by field 121 is zero or nonzero to determine whether the branch or jump is taken or not taken.

Format 116 (Short D1) consists of field 120 (an 8-bit opcode field) for designating the type of operation, field 121 (a 6-bit register specifier Ra field) for designating a register number, field 128 for designating a register number or a 12-bit immediate value and field 129 (a 1-bit operand identifier Y field) for specifying whether the content in field 128 is a register number or an immediate value. This format 116 is used for delayed jump instructions, delayed branch instructions, and repeat instructions.

Format 117 (Short D2) consists of field 120 (an 8-bit opcode field) for designating the type of operation, field 128 for designating a register number or a 12-bit immediate value, field 129 (a 1-bit operand identifier Y field) for indicating whether the content in field 128 is a register number or an immediate value and field 131 (a 6-bit displacement field ct:6) used for delayed instructions. This format 117 is used for delayed jump instructions, delayed branch instructions, and repeat instructions.

Format 118 (Long) consists of field 120 for designating the type of operation, the two fields 121 and 122 for designating register numbers and field 132 for designating a 32-bit immediate value. This format 118 is used for all instructions that take a 32-bit immediate operand such as arithmetic operations using a large immediate value, memory access operation of register relative indirect addressing with a large immediate displacement, branch instructions with a large displacement and jump instructions to absolute addresses.

FIGS. 8A, 8B, and 8C are explanation diagrams showing a register configuration in the microprocessor according to the present invention shown in FIG. 5.

The microprocessor shown in FIG. 5 comprises the general purpose register file 5 including sixty-four 32-bit general purpose registers shown in FIG. 8A, twelve control registers 150 and two accumulators 18 shown in FIG. 8C. The value in the general purpose register R0 is always zero. Therefore writing data into the register R0 has no effect.

The general purpose register R62 is the link register in which a return address from a subroutine is stored. The general purpose register R63 is the stack pointer operating, which serves as the user stack pointer (SPU) or the interrupt stack pointer (SPI) depending on the value of the SM field in the PSW 10. The control registers 150 comprise a program counter 151, the PSW 10 and other dedicated registers.

In several operations that use format 112 shown in FIG. 7, the upper 16 bits and the lower 16 bits in each of the 64 general purpose registers 5 can be used independently.

FIG. 9 is a diagram showing detailed contents of the PSW 10 in the microprocessor according to the present invention shown in FIG. 5.

As shown in FIG. 9, the upper 16 bits 170 in the PSW 10 includes the SM field 171 for switching the stack pointer, the EA field 172 for showing a detection of a self-debug trap (SDBT), the DB field 172 for enabling or disabling the SDBT, the IE field 174 for enabling or disabling interrupts, the RP field 175 for activating a repeat operation and the MD field 176 for enabling or disabling of modulo addressing. The lower 16 bits 180 includes 8 flags. The F0 flag 181 and F1 flag 182 (execution control flags) are used in conjunction to the CC bits to decide whether each operation being executed by the CPU is active or inactive. The value of each flag is changed depending on results of comparison operations and flag logical operations, according to initializing operations for these flags, or by writing a register value into the flag field 180 in flag writing operations. Contents in the flag field 180 are read out by flag-value readout operation.

Each flag in the flag fields 170 and 180 is defined as follows:

| | |
|---|---|
| SM = 0 | Stack mode 0 → SPI is used |
| SM = 1 | Stack mode 1 → SPI is used |
| EA = 0 | SDBT is not detected |
| EA = 1 | SDBT is detected |
| DB = 0 | SDBT is not accepted |
| DB = 1 | SDBT is accepted |

-continued

| | |
|---|---|
| IE = 0 | Interrupts are masked |
| IE = 1 | Interrupts are accepted. |
| RP = 0 | A block repeat is inactive |
| RP = 1 | A block repeat is active |
| MD = 0 | Modulo addressing is disabled |
| MD = 1 | Modulo addressing is enabled |
| F0 | general purpose flag (execution control flag) |
| F1 | general purpose flag (execution control flag) |
| F2 | general purpose flag |
| F3 | general purpose flag |
| F4 (S) | Saturation operation flag |
| F5 (V) | Overflow flag |
| F6 (VA) | Accumulated overflow flag |
| F7 (C) | Carry/Borrow flag |

Hereinafter, the instruction list of the microprocessor will be described.

A. Microprocessor controlling function instructions

A-1. Load/Store instructions

| | |
|---|---|
| LDB | Load one byte to a register with sign extension |
| LDBU | Load one byte to a register with zero extension |
| LDH | Load one half-word to a register with sign extension |
| LDHH | Load one half-word to a register high |
| LDHU | Load one half-word to a register with zero extension |
| LDW | Load one word to a register |
| LD2W | Load two words to registers |
| LD4BH | Load four bytes to four half-words in two registers with sign extension |
| LD4BHU | Load four bytes to four half-words in two registers with zero extension |
| LD2H | Load two half-words to two words in two registers with sign extension |
| STB | Store one byte from a register |
| STH | Store one half-word from a register |
| STHH | Store one half-word from a register high |
| STW | Store one word from a register |
| ST2W | Store two words from two registers |
| ST4HB | Store four bytes from four half-words from two registers |
| ST2H | Store two half-words from two registers |
| MODDEC | Decrement a register value by a 5-bit immediate value |
| MODINC | Increment a register value by a 5-bit immediate value |

A-2. Transfer instructions

| | |
|---|---|
| MVFSYS | Move a control register to a general purpose register |
| MVTSYS | Move a general purpose register to a control register |
| MVFACC | Move a word from an accumulator |
| MVTACC | Move two general purpose registers to an accumulator |

A-3. Compare instructions

| | |
|---|---|
| CMPcc | Compare<br>cc = EQ(equal), NE (not equal), GT(greater than), GE(greater than or equal), LT(less than), LE(less than or equal), PS(both positive), NG(both negative) |
| CMPcc | Compare unsigned<br>cc = GT, GE, LT, LE |

A-4. Maximum/Minimum instructions reserved

A-5. Arithmetic operation instructions

| | |
|---|---|
| ABS | Absolute |
| ADD | Add |
| ADDC | Add with carry |
| ADDHppp | Add half-word<br>ppp = LLL(register lower, register lower, register lower), LLH(register lower, register lower, register higher), LHL, LHH, HLL, HLH, HHL, HHH |
| ADDS | Add register Rb with the sign of the third operand |
| ADDS2H | Add sign to two half-words |
| ADD2H | Add two pairs of half-words |
| AVG | Average with rounding towards positive infinity |
| AVG2H | Average two pairs of half-words with rounding towards positive infinity |
| JOINpp | Join two half-words<br>pp = LL, LH, HL, HH |
| SUB | Subtract |
| SUBB | Subtract with borrow |
| SUBHppp | Subtract half-word<br>ppp = LLL, LLH, LHL, LHH, HLL, HLH, HHL, HHH |
| SUB2H | Subtract two pairs of half-words |

A-6. Logical operation instructions

| | |
|---|---|
| AND | bitwise logical AND |
| OR | bitwise logical OR |
| NOT | bitwise logical NOT |
| XOR | bitwise logical exclusive OR |
| ANDFG | logical AND flags |
| ORFG | logical OR flags |
| NOTFG | logical NOT a flag |
| XORFG | logical exclusive OR flags |

A-7. Shift operation instructions

| | |
|---|---|
| SRA | Shift right arithmetic |
| SRA2H | Shift right arithmetic two half-words |
| SRC | Shift right concatenated registers |
| SRL | Shift right logical |
| SRL2H | Shift right logical two half-words |
| ROT | Rotate right |
| ROT2H | Rotate right two half-words |

A-8. Bit operation instructions

| | |
|---|---|
| BCLR | Clear a bit |
| BNOT | Invert a bit |
| BSET | Set a bit |
| BTST | Test a bit |

A-9. Branch instructions

| | |
|---|---|
| BRA | Branch |
| BRATZR | Branch if zero |
| BRATNZ | Branch if not zero |
| BSR | Branch to subroutine |
| BSRTZR | Branch to subroutine if zero |
| BSRTNZ | Branch to subroutine if not zero |
| JMP | Jump |
| JMPTZR | Jump if zero |
| JMPTNZ | Jump if not zero |
| JSR | Jump to subroutine |
| JSRTZR | Jump to subroutine if zero |
| JSRTNZ | Jump to subroutine if not zero |
| NOP | No Operation |

[Delayed branch, Jump instructions]

| | |
|---|---|
| DBRA | Delayed branch |
| DBRAI | Delayed branch with immediate delay value |
| DBSR | Delayed branch to subroutine |
| DBSRI | Delayed branch to subroutine with immediate delay value |
| DJMP | Delayed jump |
| DJMPI | Delayed jump with immediate delay value |
| DJSR | Delayed jump to subroutine |
| DJSRI | Delayed jump to subroutine with immediate delayed value |

A-13. OS-related instructions

| | |
|---|---|
| TRAP | Trap |
| REIT | Return from exception, interrupts and traps |

B. DSP function instructions

B-1. Arithmetic operation instructions

| | |
|---|---|
| MUL | Multiply |
| MULX | Multiply with extended precision |
| MULXS | Multiply and shift to the right by one with extended precision |

-continued

| | |
|---|---|
| MULX2H | Multiply two pairs of half-words with extended precision |
| MULHXpp | Multiply two half-words with extended precision pp = LL, LH, HL, HH |
| MUL2H | Multiply two pairs of half-words |
| MACa | Multiply and add a (designates which accumulator to use) = 0, 1 |
| MACSa | Multiply, shift to the right by one and add a = 0, 1 |
| MSUBa | Multiply and subtract a = 0, 1 MSUBSa Multiply, shift to the right by one and subtract a = 0, 1 |

B-2. Repeat instructions

| | |
|---|---|
| REPEAT | Repeat a block of instructions |
| REPEATI | Repeat a block of instructions with immediate repeat count |

FIG. 10 is an explanation diagram showing the pipeline operation for the parallel execution of two-instructions in the microprocessor shown in FIG. 5.

This pipeline operation takes place when the value FM of the format field in the instruction is zero, that is, when FM=00. Each of the pipelines 190 and 195 consists of an instruction fetch stage 191, a decode/address operation stage 192, an execution/memory access stage 193, and a write back stage 194. During the execution operation of two instructions in parallel, the execution in the memory unit 3 and the execution in the integer operation unit 4 are performed concurrently.

Figure 11:
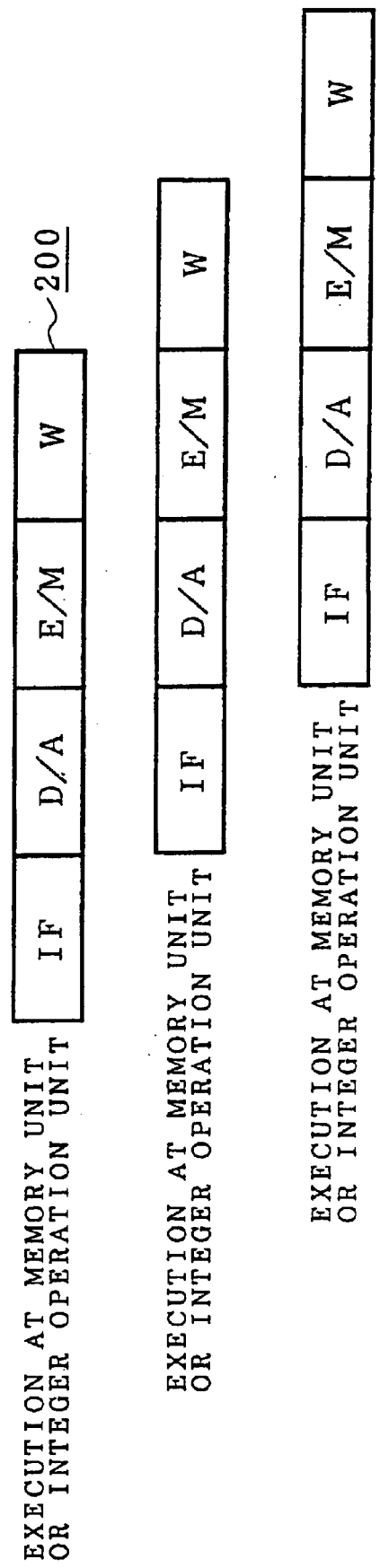
FIG. 11 is an explanation diagram showing a pipeline operation of a sequential instruction execution of the microprocessor of the first embodiment shown in FIG. 5.

FIG. 11 is an explanation diagram showing the pipeline operation for the execution of a sequential instruction in the microprocessor shown in FIG. 5. This pipeline operation takes place when the value of the instruction format field has one of the three-values 01, 10 and 11, that is when FM=01, 10 or 11. The pipeline 200 comprises an instruction fetch stage, a decode/address operation stage, an execution/memory access stage, and a write-back stage. In the case shown in FIG. 11, either the execution in the memory unit 3 or the execution in the integer operation unit 4 is executed.

Figure 12:
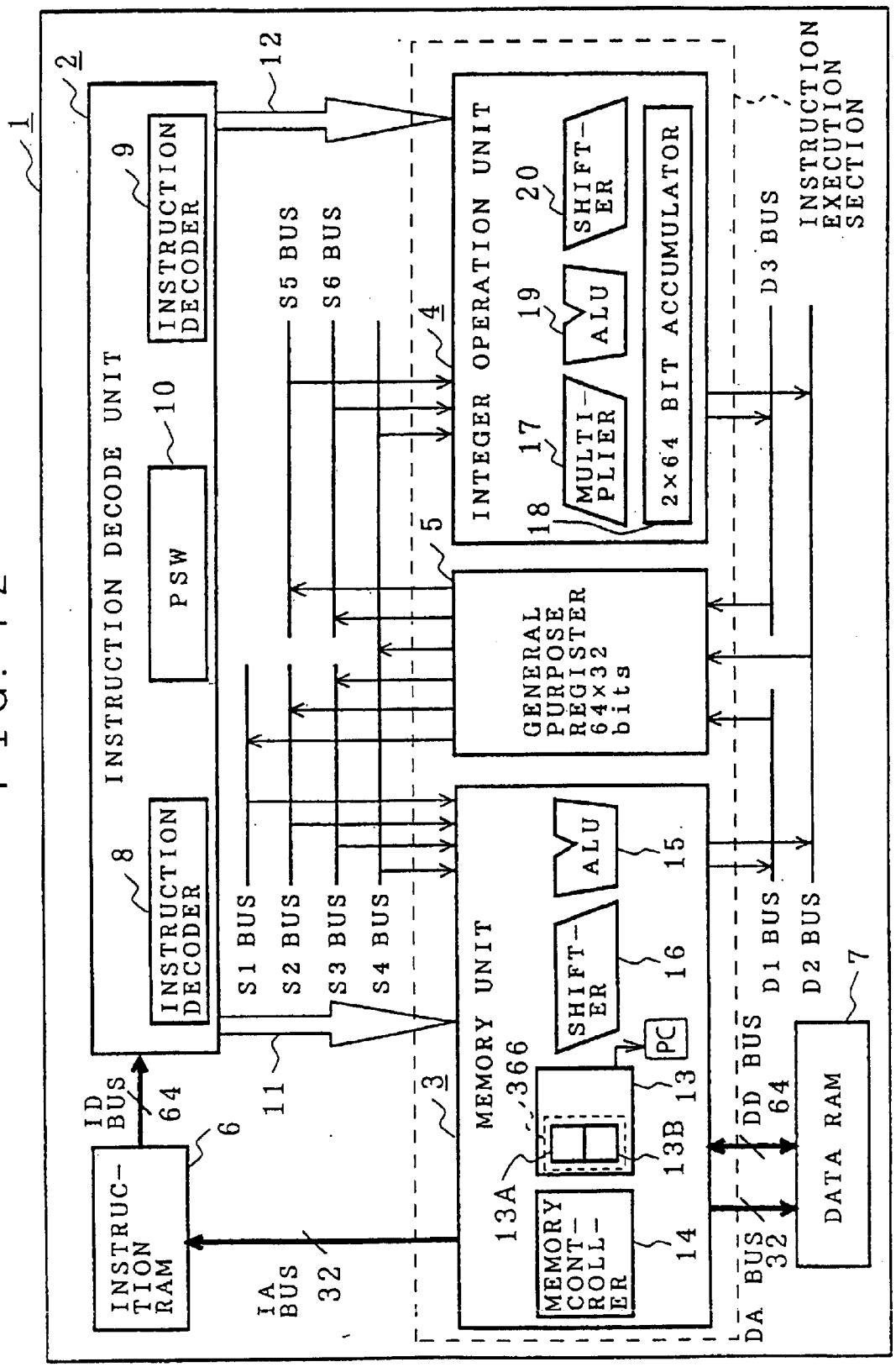
FIG. 12 is a block diagram showing a configuration of a microprocessor as the first embodiment according to the present invention.

FIG. 12 is a block diagram showing a configuration of a microprocessor as the first embodiment according to the present invention. In FIG. 12, the reference number 366 designates a delayed branch instruction register (delayed branch instruction storing means) comprising a register 13A for storing a decoded value of a delayed branch instruction and a register 13B for storing a PC value related to the time when the delayed branch instruction will be executed. This PC value means that the delayed branch instruction will be executed when the value in the program counter (PC) reaches this PC value. In FIG. 12, an instruction execution section comprises the memory unit 3 including the delayed branch instruction register 366, the integer arithmetic unit 4 and the general purpose register 5, for example.

As has been defined above, when only "a branch instruction" is used, it includes both a branch instruction and a jump instruction.

Figure 13:
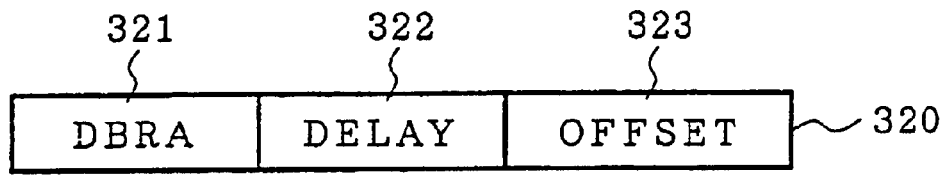
FIG. 13 is an explanation diagram showing a basic format of delayed branch instructions.

FIG. 13 is an explanation diagram showing a basic format 320 of delayed branch instructions.

Delayed branch instruction 320 comprises an opcode 321 a field 322 for designating a delayed value and a field 323 for indicating an offset or an address of a target branch address.

The delayed branch instruction is written by using format 116 (Short_D1), format 117 (Short_D2) or format 118 (Long), see FIG. 7.

Format 116 (Short_D1) is used when a value stored in a register is used as a delayed value. Format 117 (Short_D2) is used when an immediate value is used as the delayed value. Format 118 (Long) is used when a 32-bit immediate value is used as a target branch address. In each format, an opcode is written in field 120. Field 129 is used to designate whether a register number or immediate value is stored in field 128. Field 121 is used as a designated register field when a delayed value is designated by using a register in each of the instructions DBRA, DBSR, DJMP and DJSR. Field 121 is used by the DBRA, DBSR, DJMR, and DJSR instructions when the delayed count is specified within a register.

Field 131 is used to store an immediate value as a delayed value.

Figure 14:
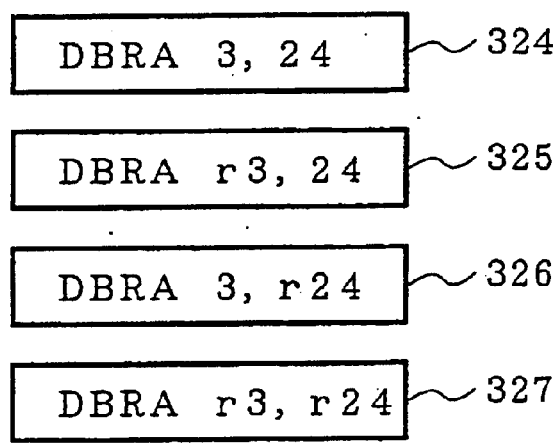
FIG. 14 is an explanation diagram showing several examples of delayed branch instructions.

FIG. 14 is an explanation diagram showing several examples of delayed branch instructions. Instruction 324 is an instruction that specifies a delayed value and a branch offset by using immediate values. Instruction 325 is an instruction that specifies a delayed value by using a register and a branch offset by using an immediate value. Instruction 326 is an instruction that specifies a delayed value by using an immediate value and a branch offset by using a register. Instruction 327 is an instruction that specifies both a delayed value and a branch offset by using registers.

Figure 15:
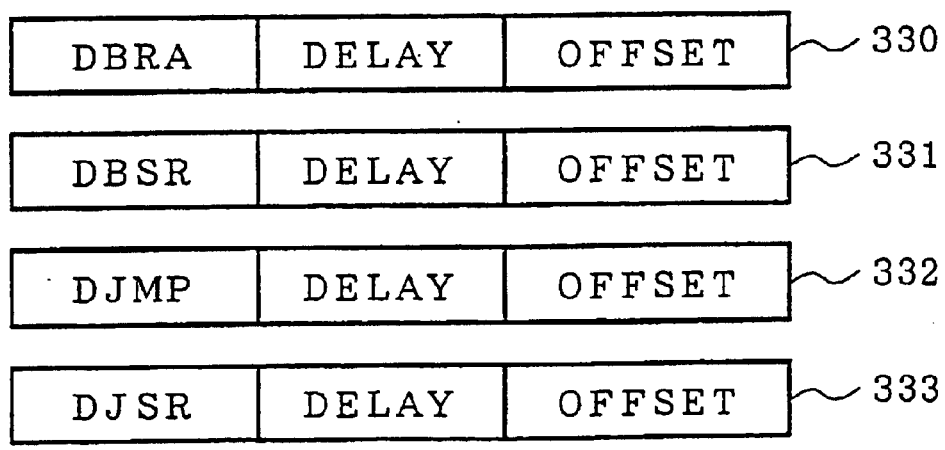
FIG. 15 is an explanation diagram showing how to realize a delayed branch instruction, a delayed jump instruction and delayed subroutine call instructions using the same format.

FIG. 15 is an explanation diagram showing how to realize the delayed branch instruction 330, the delayed jump instruction 332, and the delayed subroutine call instructions 331 and 333 in a single format.

Next, the operation of the microprocessor of the first embodiment shown in FIG. 12 is explained.

When the instruction decoder 8 in the instruction decode unit 8 recognizes that a decoded instruction is a delayed branch instruction, the instruction decoder unit 2 generates a control signal 11 and transfers it to the memory unit 3.

In the memory unit 3, the PC controller 13 stores the decoded instruction into register 13A according to the control signal 11 received from the instruction decoder unit 2. Accordingly, the register 13A stores information indicating the target of a delayed branch instruction. The PC controller 13 stores a PC value related to the time when the branch instruction will be executed into register 13B.

When the value of the program counter (PC) in the microprocessor is equal to the value stored in register 13B, the PC controller 13 executes the branch instruction based on the target branch information stored in register 13A. That is, the value designated by the target branch information stored in register 13A is set into the program counter (PC). As a result, when the address of a fetched instructions is equal to the value stored in register 13B, the instruction at the target of a branch is fetched in the following cycles.

FIG. 16 is an explanation diagram showing an example of a program including delayed instructions.

The instruction DBRA in the second line of the program shown in FIG. 16 is an instruction in which the delayed value is "3" and the target of a branch is TGT1.

In the instruction decode unit 2, when the instruction DBRA is decoded, the PC controller 13 stores information related to the branch target TGT1 into register 13A. In addition, the PC value related to the delayed value "3", that is, a value obtained by adding 3×8 (=24) to the current PC value is stored in register 13B.

The three instructions SUB, SRA, and ADD stored below the instruction DBRA are executed after the DBRA instruction. When the instruction in the third delay slot is fetched, the PC value in the microprocessor becomes equal to the PC value stored in register 13B. Here, the PC controller 13 executes the branch processing related to the DBRA instruction. That is, the PC controller 13 transfers the value stored in register 13B into the program counter (PC) in the microprocessor in order to execute the branch scheduled earlier.

FIG. 17 is an explanation diagram showing another example of a program including delayed instructions. In this case, the instruction a delayed subroutine call (DJSR) instruction is used. The value stored in register r4 in the general purpose register file 5 is used as the delayed value. In this case, the PC controller 13 stores information related to the value TGT1 indicating a branch target into register 13A. In addition, the PC controller 13 stores information related to the value set in register r4 into register 13B. When the value stored in the register r4 is "4", the four instructions written below the DJSR instruction shown in FIG. 17 will be executed without after the DJSR instruction. In this case, when the instruction stored in the fourth delay slot is fetched, the PC value in the microprocessor becomes equal to the PC value stored in register 13B. At this point, the PC controller 13 executes a subroutine jump operation related to the DJSR instruction. In practice, the PC value stored in register 13B is set into the program counter (PC).

As described above, since the microprocessor having delayed instructions has a configuration in which the PC value related to a delayed value designated by the delayed branch instruction is stored temporarily into a register, the delayed branch instruction can be correctly executed even if any operations, such as an interrupt operation, to change the PC value during the time period between the decoded time of the delayed branch instruction and the execution time of the delayed branch instruction. For example, in the program shown in FIG. 16, the PC value in the microprocessor can be changed by an interrupt that uses several cycles when this interrupt happens during the execution of the instructions stored in the delay slots. In conventional microprocessors, because the execution time of the delayed branch instruction is stored as a counter value, the time at which a delayed branch instruction is executed, gets shifted by the cycle count which are required for the interrupt process. On the other hand, this does not happen in the microprocessor having delayed instructions according to the first embodiment. That is, the execution time of the delayed branch instruction is not shifted in the microprocessor of the first embodiment. Furthermore, for context switches after interrupts within the execution of instructions stored in the delay slots, if the microprocessor of the first embodiment has instructions to access registers 13A and 13B, it is possible to store both the branch information stored in register 13A and the PC value of the branch stored in register 13B into the data RAM 7. After different contexts are executed, it is also be possible to restore these values into registers 13A and 13B in order to then execute the delayed branch instruction previously fetched when the process flow is returned to the interrupted context.

Second Embodiment

Figure 18:
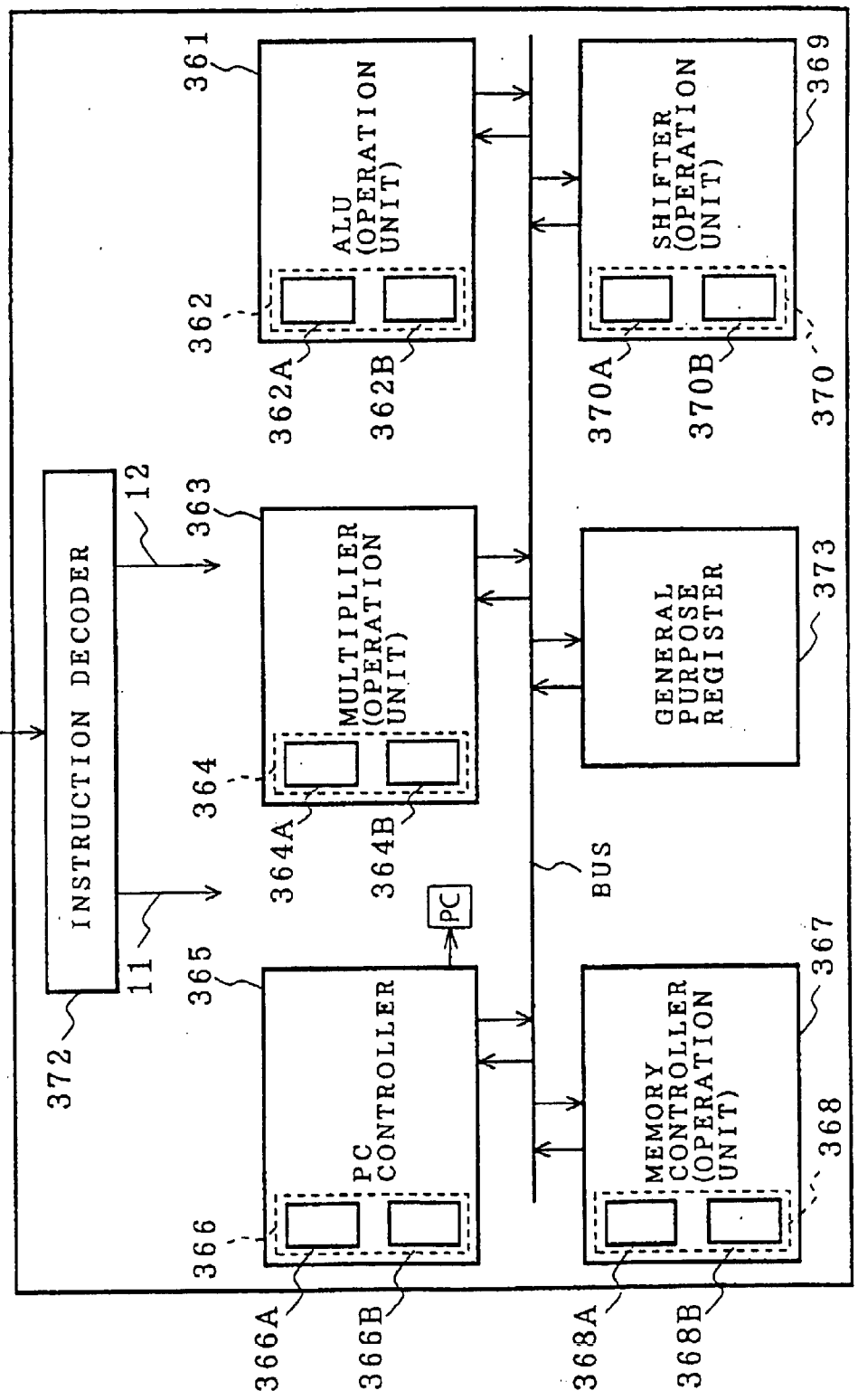
FIG. 18 is a block diagram showing an instruction decode section and an instruction execution section in a microprocessor as the second embodiment according to the present invention.

FIG. 18 is a block diagram mainly showing an instruction decode section comprising an instruction decoder 372 and an instruction execution section in the microprocessor as the second embodiment according to the present invention. In FIG. 18, the reference number 361 designates an arithmetic logic unit ALU (operation unit) for executing arithmetic logic operations, 363 denotes a multiplier (operation unit) for executing multiply operations, 365 indicates a PC controller for calculating a PC value, 367 designates a memory controller (operation unit) for executing address calculations, 369 indicates a shifter (operation unit) for executing shift operations, 371 indicates a bus group consisting of buses through which two instructions (instructions including the indication for two operations) will be transferred during one cycle, 372 designates the instruction decoder for decoding instructions and for generating and transferring control signals 11 and 12 as decoded results to the instruction execution section, and 373 indicates a general purpose register file.

In the ALU 361, the reference number 362 designates a delayed instruction register (delayed instruction storing means) comprising a register 362A for storing a decoded result obtained by decoding a delayed arithmetic logic operation instruction and a register 362B for storing a value related to the delayed value.

In the multiplier 363, the reference number 364 designates a delayed instruction register (delayed instruction storing means) comprising a register 364A for storing a decoded result obtained by decoding a delayed multiply instruction and a register 364B for storing a value related to the delayed value.

In the PC controller 365, the reference number 366 designates a delayed instruction register (delayed branch instruction storing means) comprising a register 366A for storing a decoded result obtained by decoding a delayed branch instruction and a register 366B for storing a value related to the delayed value.

In the memory controller 367, the reference number 368 designates a delayed instruction register (delayed instruction storing means) comprising a register 368A for storing a decoded result obtained by decoding a delayed memory access instruction and a register 368B for storing a value related to the delayed value.

In the shifter 369, the reference number 370 designates a delayed instruction register (delayed instruction storing means) comprising a register 370A for storing a decoded result obtained by decoding a delayed shift instruction and a register 370B for storing a value related to the delayed value.

Next, the operation of the microprocessor having delayed instructions as the second embodiment will now be explained.

Figure 1:
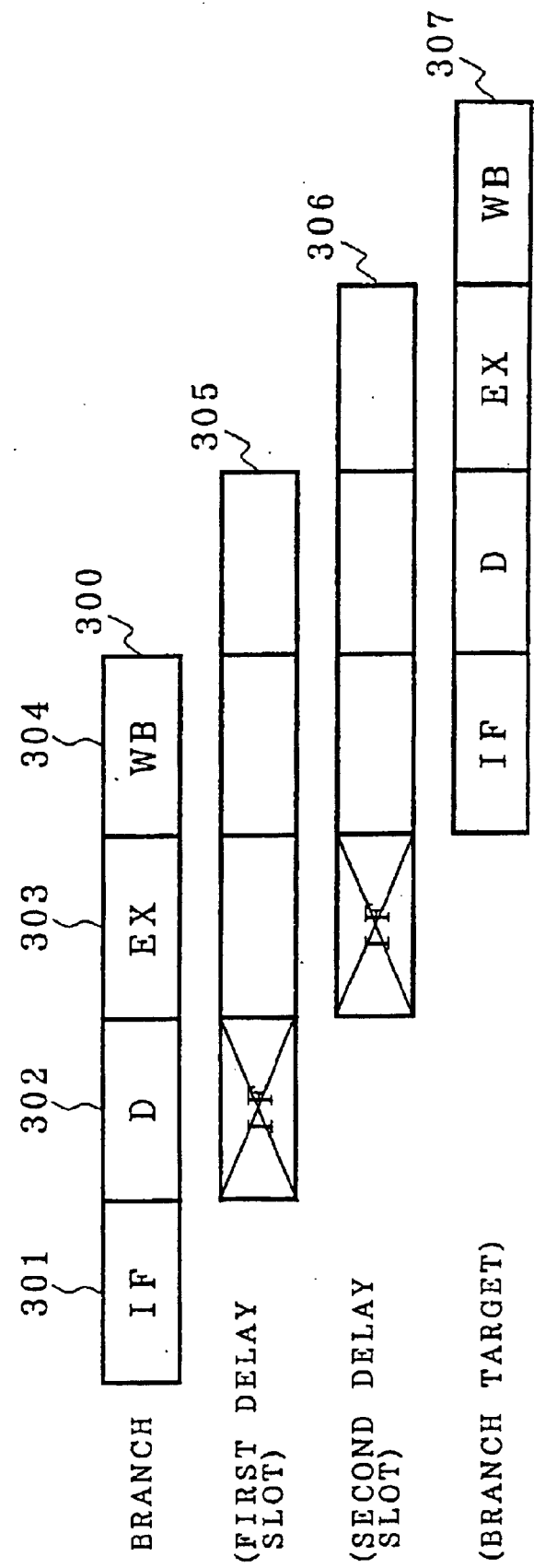
FIG. 1 is a diagram showing a process sequence of a conventional microprocessor based on a pipeline control.
Figure 2:
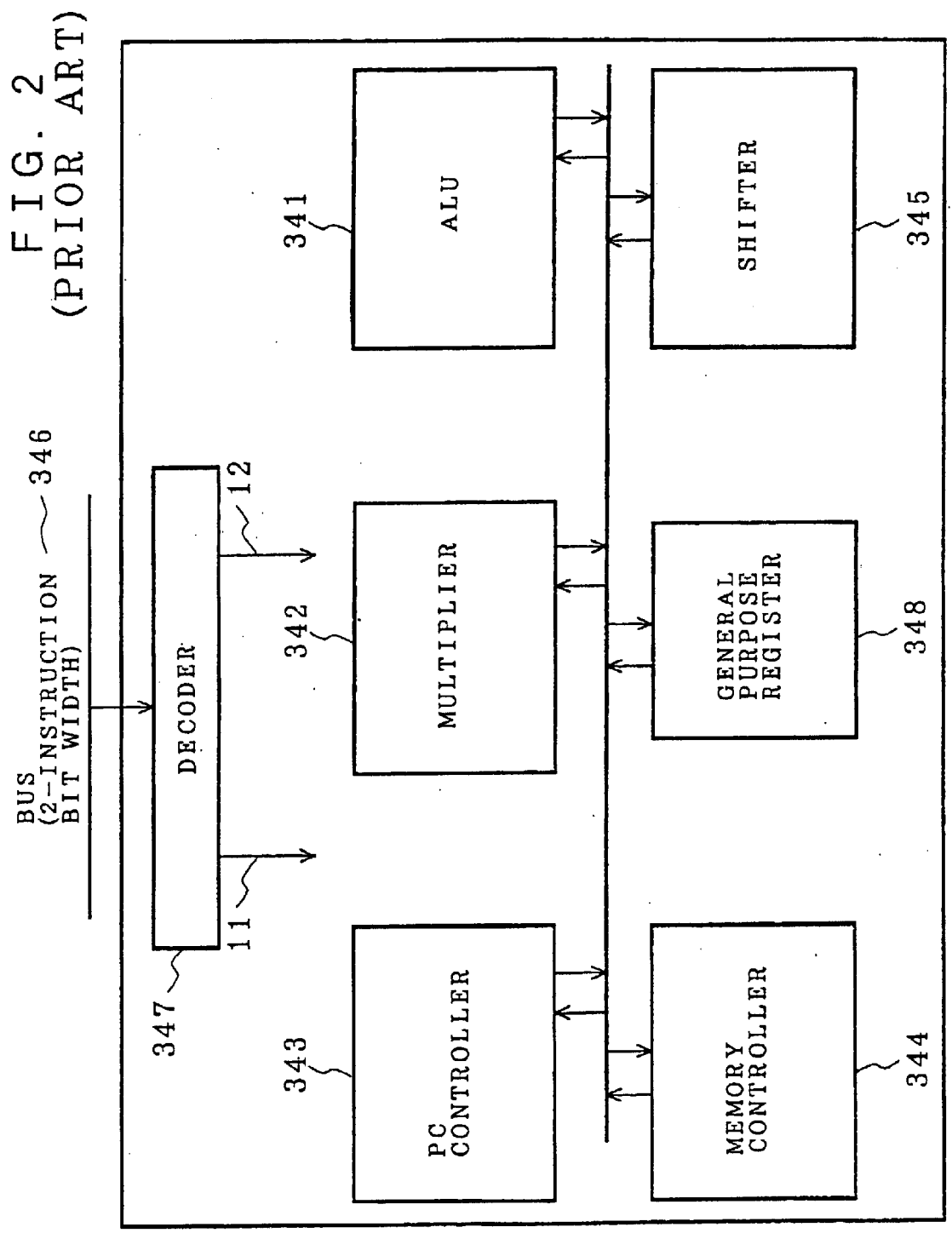
FIG. 2 is a block diagram showing a common configuration of an instruction decoder and an instruction execution section in a conventional microprocessor which is capable of performing two operations at the same time.

FIG. 19 is an explanation diagram showing an example of an instruction arrangement when two operations are executed at the same time. This instruction arrangement of the program shown in FIG. 19 is the result of instruction scheduling of the program shown in FIG. 3. The conventional microprocessor capable of executing two instructions at the same time shown in FIG. 2 requires five cycles, which have already been shown in FIG. 4, in order to execute the program shown in FIG. 3 and the conventional microprocessor cannot execute the instructions SRA and SUB at the same time because both instructions SRA and SUB have a register dependence relationship on register r3. On the other hand, the microprocessor of the second embodiment can execute the delayed branch instructions, as shown in FIG. 19, it can replace the NOP in the second line with the instruction DJUMP having the delayed value "2". When each instruction in the instruction arrangement of the program shown in FIG. 19 is loaded from memory sequentially, the ALU 361 and the shifter 369 in the microprocessor execute the ADD operation and the SRA operation in the first line during the first cycle, respectively. During the second cycle, the shifter 369 and the PC controller 365 perform the SRA operation and the DJUMP operation, respectively. The shifter 369 can execute the SRA operation at once, the PC controller 365 stores information relating to the branch target TGT as the decoded result of the DJUMP operation into register 366A and stores the PC value related to the delayed value "2" into register 366B, just like the case of the microprocessor of the first embodiment shown in FIG. 12.

During the third cycle, both the ALU 361 and the multiplier 363 execute the SUB operation and the MUL operation in the third line shown in FIG. 19, respectively.

During the fourth cycle, both the ALU 361 and the multiplier 363 execute the ADD operation and the MUL operation in the fourth line shown in FIG. 19, respectively. When the instruction in the fourth line is executed, the PC value stored in the program counter PC (not shown in FIG. 18) in the microprocessor becomes equal to the PC value stored in the register 366B. Then, the PC controller 365 executes the jump instruction specified by the DJUMP operation. From an implementation perspective, the PC value stored in register 366B is set into the program counter PC.

Thus, when a microprocessor is capable of processing branch instructions in which a variable delayed value can be designated, it is possible to execute instruction scheduling effectively. That is, programmers and compilers can perform instruction scheduling to reduce the program size. Thereby, the operation time required for executing processes can be reduced. In addition, because the PC controller 365 stores the branch instruction execution time as the PC value, the delayed branch instruction can be executed correctly.

The microprocessor having delayed instructions of the second embodiment can execute delayed operation instructions other than the delayed branch instructions.

FIG. 20 is an explanation diagram showing an example of a program. The conventional microprocessor capable of executing two normal operations at the same time shown in FIG. 2 cannot execute the ADD operation at the first line and the ADD operation at the second line at the same time because it has only one ALU 341. Accordingly, the conventional microprocessor cannot perform the instruction scheduling in which the instructions at the first and the second lines shown in FIG. 20 are executed at the same time.

On the other hand, the microprocessor of the second embodiment can execute each of the instructions shown in FIG. 21 obtained by scheduling the instructions shown in FIG. 20.

When the instructions in the instruction arrangement shown in FIG. 21 are loaded from memory sequentially, the microprocessor of the second embodiment executes the ADD operation and the DADD operation (delayed ADD operation) in the first cycle. That is, the decoded result of the DADD instruction is stored into register 362A and a value related to the delayed value "1" is stored into register 362B.

In the second cycle, both the shifter 369 and the multiplier 363 execute the SRA operation and the MUL operation, respectively. When the second instruction is fetched, the PC value becomes equal to the value related to the delayed value "1" stored in register 362B. Then, the ALU 361 receives operation indication contents designated by the DADD instruction from register 362A and executes operation. In this case, it is acceptable to store a PC value or a counter value, which will be changed according to operation clocks, as the value related to the delayed value stored in register 362B. When the PC value is used as the value related to the delayed value, it is simple to handle interrupts even if the interrupts or the like happen during the time period between decoding of the operation and execution of the operation. In the explanation of the microprocessor of the second embodiment described above, the ALU 361 is used as the operation unit for executing the delayed operation instructions. But, the present invention is not limited to this case, for example, each of the multiplier 363, the memory controller 367, and the shifter 369 can treat delayed operation instructions by using the same manner as the ALU 361. In addition, in the explanation described above, the delayed value "1" is used, however, other variable delayed values can be used. Because a variable delayed value can be used in the microprocessor of the second embodiment, the degree of instruction scheduling can be increased.

In addition, according to the present invention, even if a microprocessor capable of executing delayed instructions specifying only fixed values is used, although the effect of this microprocessor is smaller than that of the microprocessor capable of using variable delayed values, the degree of instruction scheduling can also be increased.

As described above, in the microprocessor of the second embodiment having the configuration capable of handling delayed operation instructions, the number of cycles required to execute a program can be decreased. This causes a reduction in the program execution time. For example, when the conventional microprocessor shown in FIG. 2 capable of executing two operations at the same time executes the program shown in FIG. 20, this conventional microprocessor cannot execute two ADD instructions at the same time. Therefore the conventional microprocessor requires three cycles to execute the program even if instruction scheduling is performed.

FIG. 21 is an explanation diagram showing an instruction arrangement when two operation are executed at the same time based on each instruction shown in FIG. 20. The microprocessor of the second embodiment, as clearly shown in the example of FIG. 21, requires only two cycle to execute the instructions. In addition, the microprocessor of the second embodiment can execute at a high speed rate when delayed instructions may be written in a loop processing in a program. Thus, in particular, the delayed instructions can be effectively used in the microprocessors executing two operations at the same time because, as clearly shown in the examples of FIG. 19 and FIG. 21, the number of NOPs can be reduced.

Although the explanation of the second embodiment has used the microprocessor capable of executing the two operations at the same time, the present invention is not limited by this case, for example, the delayed operation instruction processing system can be applied to a microprocessor comprising a plurality of operation units such as the ALU 361 that is a resource. In this microprocessor, the number of execution cycles is reduced and the processing speed is increased.

FIG. 22 is an explanation diagram showing an example of a PSW in the microprocessor of the second embodiment according to the present invention shown in FIG. 18. The PSW 380 and 390 shown in FIG. 22 has the same configuration as the PSW shown in FIG. 9; the RP field 381 is used to indicate whether or not the operation of the delayed instruction register 366 within the PC controller 365 is active. In addition, the psw of FIG. 22 for example, the E4 field 382, the E3 field 383, the E2 field 384, and the E1 field 385 in the PSW 380 and 390 are used to indicate whether or not the operations of the delayed instruction register 362 in the ALU 361, of the delayed instruction register 368 in the memory controller 367, and the delayed instruction register 370 in the shifter 369 are active, respectively.

When any of these bits in the PSW is in an invalid state, the processing the corresponding delayed instruction is disabled. Thus, using the PSW 380 and 390 increases the flexibility of the delayed instruction processing.

Third Embodiment

FIG. 23 is a block diagram showing an instruction decode section and an instruction execution section in a microprocessor as the third embodiment according to the present invention.

In FIG. 23, the reference number 461 designates a arithmetic logic unit ALU (operation unit) for executing arithmetic operations, 463 denotes a multiplier (operation unit) for executing multiply operations, 465 indicates a PC controller for calculating a PC value, 467 designates a memory controller (operation unit) for executing address calculations, 469 indicates a shifter (operation unit) for executing shift operations, 371 indicates the bus group consisting of the buses through which two instructions (instructions including the indication for two operations) are transferred during each cycle, 372 designates the decoder for decoding instructions and for transferring the control signals 11 and 12 as decoded results to the instruction execution section, and 373 indicates the general purpose register file.

In the microprocessor of the third embodiment shown in FIG. 23, the ALU 461 comprises a pair of delayed instruction registers 362-1 and 362-2, the multiplier 463 comprises a pair of delayed instruction registers 364-1 and 364-2, the PC controller 465 comprises a pair of delayed instruction registers 366-1 and 366-2, the memory controller 467 comprises a pair of delayed instruction registers 368-1 and 368-2, and the shifter comprises a pair of delayed instruction registers 370-1 and 370-2.

Next, the operation of the microprocessor of the third embodiment will now be explained.

In each of the operation units 461, 463, 467, 469, and the PC controller 465, sets of the decoded results of an instruction and their delayed values are stored into a queue to control it. For example, in the ALU 461, we assume that the decoded result of a delayed arithmetic operation instruction is stored into the register 362A in the delayed instruction registers 362-1 and the value associated with the delayed value related to the decoded result is stored into register 362B. In this case, when the new decoded result of another delayed arithmetic operation instruction is transferred from the instruction decoder 372, this new decoded result and its associated delayed value are stored into the registers 362A and 362B in the delayed instruction register 362-2, respectively. Then, the operation corresponding to the decoded result stored in the register 362A in one of the delayed instruction registers 362-1 and 362-2 is executed when the associated delayed value in register 362B in this selected delayed instruction register is equal to the PC value of the program counter PC in the microprocessor. After this, when the value related to the delayed value stored in register 362B in the other delayed instruction register (which has not been selected) is equal to the PC value in the program counter PC, the operation related to the decoded value stored in register 362A in the other delayed instruction register is executed.

In the microprocessor of the third embodiment having the configuration described above, a second delayed instruction can be executed even if the first delayed instruction has not reached its execution time. In this case, the second delayed instruction is of the same type as the first delayed instruction. For example, when a delayed ADD instruction has not reached its execution time, the ALU 461 can receive a new delayed ADD instruction because the ALU 461 has a pair of delayed instruction registers 362-1 and 362-2. Accordingly, the degree of instruction scheduling can be increased and program size can be reduced, this in effect decreases the size of an instruction memory needed for a particularly task. In addition, programs can be executed at a higher rate since more instructions can be scheduled concurrently.

In the explanation of the microprocessor of the third embodiment, the number of delayed instruction registers in each of the operation units 461, 463, 467, 469, and the PC controller 465 is two, but the present invention is not limited by this configuration, the number of delayed instruction registers in each unit can be increased for different applications.

As described above in detail, according to the present invention, the microprocessor having delayed instructions has the configuration in which the PC value in a program counter related to a delayed value designated in a delayed branch instruction to be executed can be stored. Thereby, the delayed branch instruction can be executed correctly even if the PC value is changed during the time period from the time at which the delayed branch instruction is decoded to the time at which execute the delayed branch instruction is executed.

In addition, according to the present invention, the microprocessor having delayed instructions has the configuration in which each operation unit can store a value related to a fixed delayed value or a variable delayed value of a delayed operation instruction. Thus, the degree of flexibility of instruction scheduling is increased.

Furthermore, according to the present invention, the microprocessor having delayed instructions has the configuration in which each operation unit can store a value related to a fixed delayed value or a variable delayed value designated by a delayed operation instruction. Thus, the number of cycles required to execute programs, the size of an instruction memory, and the operation time of the programs can all be reduced.

Moreover, according to the present invention, the microprocessor having delayed instructions has the configuration in which each operation unit can store a PC value related to a delayed value designated by a delayed operation instruction. Thereby, the number of cycles required to execute programs can be reduced and the delayed instruction can be executed correctly even if the PC value is changed within the time period from the time at which the delayed instruction is decoded and the time at which the delayed instruction is executed.

In addition, according to the present invention, the microprocessor having delayed instructions has the configuration in which each operation unit comprises a plurality of delayed instruction storing means. Thereby, the degree of instruction scheduling can be increased.

Furthermore, according to the present invention, the microprocessor having delayed instructions has the configuration in which an instruction execution section can execute a plurality of operations at the same time. Thereby, there is the effect that the degree of instruction scheduling can be increased and the number of cycles required to execute programs can be reduced.

While the above provides a full and complete disclosure of the preferred embodiments of the present invention, various modifications, alternate constructions, and equivalents may be employed without departing from the true spirit and scope of the invention. Therefore the above description and illustration should not be construed as limiting the scope of the invention, which is defined by the appended claims.

What is claimed is:

1. A microprocessor comprising:
   an instruction decoder receiving a branch instruction from a memory, for decoding the branch instruction to output a decoded result, said branch instruction including a first field specifying a branch operation and a second field specifying delayed value information;
   a program counter for calculating and outputting an address value designating a location of the memory at which an instructions to be processed is stored to control a program sequence; and a program counter controller for controlling said program counter, said program counter controller including a first register for storing a first program counter value based on the delayed value information stored in said second field, wherein upon said program counter controller detecting a coincidence of the first program counter value stored in said first register with the value of said program counter, said program counter controller sets a second program counter value indicating a branch target of the branch instruction into said program counter.

2. The microprocessor as set forth in claim 1, wherein said program counter controller includes a second register for storing the decoded result output from said instruction decoder, and the decoded result stored in said second register includes information indicating the second program counter value, and said program counter controller sets the second program counter value into said program counter in accordance with the decoded result stored in said second register.

3. The microprocessor as set forth in claim 1, wherein said instruction decoder decodes another branch instruction to output another decoded result, said program counter controller controls said program counter on the basis of the other decoded result, and said program counter controller includes a third register for storing a third program counter value, and detects a coincidence of the third program counter value stored in said third register with a value of said program counter to set a fourth program counter value indicating a branch target of the other branch instruction into said program counter.

4. A microprocessor comprising:

an instruction decoder receiving an adding instruction from a memory, for decoding the adding instruction to output a decoded result, said adding instruction including a first field specifying an adding operation and a second field specifying delayed value information;

an instruction execution unit for performing an adding operation based on the delayed value information stored in said second field; and a program counter for calculating and outputting an address value designating a location of the memory at which an instruction to be processed is stored to control a program sequence, wherein said instruction execution unit includes a first register for storing a first value, and starts the adding operation depending on the first value stored in the first register, and said first value is a program counter value, and said instruction execution unit starts said adding operation in the case of a coincidence of said program counter value stored in said first register with the value of said program counter.

5. The microprocessor as set forth in claim 4, wherein said instruction execution unit includes a second register for the decoded result output from said instruction decoder and performs the adding operation on the basis of the decoded result stored in said second register in the case of a coincidence of said program counter value stored in said first register with the value of said program counter.

6. The microprocessor as set forth in claim 4, wherein said instruction execution unit includes an arithmetic logical unit for performing the adding operation.

7. The microprocessor as set forth in claim 4, wherein said instruction decoder decodes another adding instruction to output another decoded result, said instruction execution unit performs another adding operation on the basis of the other decoded result, and said instruction execution unit includes a third register for storing a second value, and starts the other adding operation at the time indicated by the second value stored in said third register.

8. A microprocessor comprising:

an instruction decoder receiving a multiplying instruction from a memory, for decoding the multiplying instruction to output a decoded result, said multiplying instruction including a first field specifying a multiplying operation and a second field specifying delayed value information;

a multiplier for performing a multiplying operation based on the delayed value information stored in said second field; and a program counter for calculating and outputting an address value designating a location of the memory at which an instruction to be processed is stored to control a program sequence, wherein said multiplier includes a first register for storing a first value, and starts the multiplying operation depending on the first value stored in said first register, and said first value stored in said first register is a program counter value, and said multiplier starts said multiplying operation in the case of a coincidence of said program counter value stored in said first register with the value of said program counter.

9. The microprocessor as set forth in claim 8, wherein said multiplier includes a second register for the decoded result output from said instruction decoder and performs the multiplying operation on the basis of the decoded result in said second register in the case of a coincidence of said program counter value stored in said first register with the value of said program counter.

10. The microprocessor as set forth in claim 8, wherein said instruction decoder decodes another instruction to output another decoded result, said multiplier performing another multiplying operation on the basis of the other decoded result, and said multiplier includes a third register for storing a second value and starts the other multiplying operation at the time indicated by the second value stored in said third register.

11. A microprocessor comprising:

an instruction decoder receiving an instruction from a memory, for decoding the instruction to output a decoded result, said instruction including a first field specifying a shift operation and a second field specifying delayed value information;

a shifter for performing a shift operation based on the delayed value information stored in said second field; and a program counter for calculating and outputting an address value designating a location of the memory at which an instruction to be processed is stored to control a program sequence, wherein said shifter includes a first register for storing a first value, and starts the shift operation depending on the first value stored in the first register, and said first value stored in said first register is a program counter value, and said shifter starts said shift operation in the case of a coincidence of said program counter value stored in said first register with the value of said program counter.

12. The microprocessor as set forth in claim 11, wherein said shifter includes a second register for the decoded result output from said instruction decoder and performs the shift operation on the basis of the decoded result stored in said second register in the case of a coincidence of said program counter value stored in said first register with the value of said program counter.

13. The microprocessor as set forth in claim 11, wherein said instruction decoder decodes another instruction to output another decoded result, said shifter performs another shift operation on the basis of the other decoded result, and said shifter includes a third register for storing a second value and starts the other shift operation at the time indicated by the second value stored in said third register.

14. A microprocessor comprising:
an instruction decoder receiving an instruction from a memory, for decoding the instruction to output a decoded result, said instruction including a first field specifying a memory controlling operation and a second field specifying delayed value information;
a memory controller for controlling an access of an operand data by outputting an operand address of operand data to a memory based on the delayed value information stored in said second field; and
a program counter for calculating and outputting an address value designating a location of the memory at which an instruction to be processed is stored to control a program sequence,
wherein said memory controller includes a first register for storing a first value, and starts the access depending on the first value stored in the first register, and
said first value stored in said first register is a program counter value, and said memory controller starts the access in the case of a coincidence of said program counter value stored in said first register with the value of said program counter.

15. The microprocessor as set forth in claim 14, wherein said memory controller includes a second register for the decoded result output from said instruction decoder and controls the access on the basis of the decoded result stored in said second register in the case of a coincidence of said program counter value stored in said first register with the value of said program counter.

16. The microprocessor as set forth in claim 14, wherein said instruction decoder decodes another instruction to output another decoded result, said memory controller controls another access of the operand data to the memory on the basis of the other decoded result, and said memory controller includes a third register for storing a second value, and starts the other access at the time indicated by the second value stored in said third register.

17. A microprocessor comprising:
an instruction decoder receiving a delayed instruction from a memory, for decoding the delayed instruction to output a control signal, said delayed instruction including a field for specifying a delay value;
a program counter for calculating and outputting an address value designating a location of the memory at which an instruction to be processed is stored to control a program sequence; and
an instruction execution unit performing an operation specified by the delayed instruction based on the control signal in a case of a coincidence between a value of said program counter and a first program counter value which is specified by the field of the delayed instruction as the delay value.

18. A microprocessor according to claim 17, further comprising a first register storing the control signal output from said instruction decoder, said instruction executing unit performing the operation with reference to said first register when the coincidence is detected.

19. A microprocessor according to claim 17, further comprising a second register for storing delay value information, wherein
the field of the delayed instruction indicates said second register, the first program counter value obtained from the delay value information stored in said second register and a value of said program counter.

20. A microprocessor according to claim 17, wherein
the first program counter value is obtained from contents of the field of the delayed instruction and a value of said program counter.

21. A microprocessor according to claim 17, further comprising:
a first register for storing the first program value, and
a second register for storing a second program counter value specified by another delayed instruction, wherein
said instruction decoder decodes said another delayed instruction to output another control signal, said instruction execution unit performing an operation specified by the another delayed instruction based on the another control signal, wherein
said instruction execution unit executes the operation specified by the another delayed instruction in accordance with the another control signal in a case of a coincidence between the value of said program counter and the second program counter value stored in said second register.

22. A microprocessor according to claim 21, further comprising: third and fourth registers storing the control signal and another control signal,
respectively, said instruction execution unit performing the operations specified by the delayed instruction and another instruction with reference to said third and fourth registers, respectively.

23. A microprocessor according to claim 17, wherein
said delayed instruction is one of a branch instruction, an arithmetic logical operation instruction, a shift instruction, a memory access instruction and a multiply instruction.

* * * * *